United States Patent
Dogru

(10) Patent No.: US 10,113,400 B2
(45) Date of Patent: *Oct. 30, 2018

(54) SEQUENTIAL FULLY IMPLICIT WELL MODEL WITH TRIDIAGONAL MATRIX STRUCTURE FOR RESERVOIR SIMULATION

(71) Applicant: Saudi Arabian Oil Company, Dhahran (SA)

(72) Inventor: Ali H. Dogru, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 357 days.

This patent is subject to a terminal disclaimer.

(21) Appl. No.: 15/061,572

(22) Filed: Mar. 4, 2016

(65) Prior Publication Data

US 2016/0186535 A1 Jun. 30, 2016

Related U.S. Application Data

(63) Continuation-in-part of application No. 14/040,930, filed on Sep. 30, 2013, now Pat. No. 9,494,709, which
(Continued)

(51) Int. Cl.
*E21B 43/00* (2006.01)
*G06F 17/50* (2006.01)

(52) U.S. Cl.
CPC .......... *E21B 43/00* (2013.01); *G06F 17/5009* (2013.01); *G06F 2217/16* (2013.01)

(58) Field of Classification Search
CPC ..... E21B 43/00; G06F 17/5009; G06F 2217/16
See application file for complete search history.

(56) References Cited

U.S. PATENT DOCUMENTS

| 4,991,095 A | 2/1991 | Swanson |
| 6,018,497 A | 1/2000 | Gunasekera |
(Continued)

FOREIGN PATENT DOCUMENTS

GB 2458205 A 9/2009

OTHER PUBLICATIONS

Chen, Y., et al. "A Coupled Local—Global Upscaling Approach for Simulating Flow in Highly Heterogeneous Formations" Advances in Water Resources, vol. 26, pp. 1041-1060 (2003) (Year: 2003).*
(Continued)

*Primary Examiner* — Jay Hann
(74) *Attorney, Agent, or Firm* — Bracewell LLP; Constance G. Rhebergen; Albert B. Kimball, Jr.

(57) ABSTRACT

A subsurface hydrocarbon reservoir with horizontal or multiple vertical wells is simulated by sequential solution of reservoir and well equations to simulate fluid flow inside the reservoir and well production rates. Sequential solution of reservoir and well equations treats wells as specified bottom hole pressure wells. This avoids solving large matrices resulting from the simultaneous solution of the reservoir and well equations which can be computationally very expensive for large number of unknowns and require special sparse matrix solvers. Such sequential solution involves regular reservoir system solvers complemented by a small matrix for the numerical solution of the well bottom hole pressures.

18 Claims, 23 Drawing Sheets

Related U.S. Application Data is a continuation of application No. 13/023,728, filed on Feb. 9, 2011, now Pat. No. 9,164,191.

(56) References Cited

U.S. PATENT DOCUMENTS

| | | | |
|---|---|---|---|
| 6,078,869 | A | 6/2000 | Gunasekera |
| 6,106,561 | A | 8/2000 | Farmer |
| 7,369,979 | B1 | 5/2008 | Spivey |
| 7,451,066 | B2 | 11/2008 | Edwards et al. |
| 7,627,461 | B2 | 12/2009 | Guyaguler et al. |
| 7,933,758 | B2 | 4/2011 | Gallagher, Jr. et al. |
| 8,285,532 | B2 | 10/2012 | Zangl et al. |
| 8,396,699 | B2 | 3/2013 | Maliassov |
| 9,058,445 | B2* | 6/2015 | Usadi .................. G06F 17/5009 |
| 9,418,180 | B2 | 8/2016 | Maliassov |
| 2006/0036418 | A1 | 2/2006 | Pita et al. |
| 2006/0235667 | A1 | 10/2006 | Fung et al. |
| 2006/0282243 | A1 | 12/2006 | Childs et al. |
| 2007/0265815 | A1 | 11/2007 | Couet et al. |
| 2007/0271077 | A1 | 11/2007 | Kosmala et al. |
| 2009/0248378 | A1 | 10/2009 | Li et al. |
| 2009/0299714 | A1 | 12/2009 | Kelkar et al. |
| 2010/0094605 | A1 | 4/2010 | Hajibeygi et al. |
| 2010/0114544 | A1* | 5/2010 | Dogru .................. E21B 49/00 703/10 |
| 2010/0191511 | A1 | 7/2010 | Hsu et al. |
| 2010/0250216 | A1 | 9/2010 | Narr et al. |
| 2010/0312535 | A1 | 12/2010 | Chen et al. |
| 2011/0011595 | A1 | 1/2011 | Huang et al. |
| 2011/0015909 | A1 | 1/2011 | Zhao |
| 2011/0024125 | A1 | 2/2011 | Wallace et al. |
| 2012/0203518 | A1* | 8/2012 | Dogru .................. E21B 43/00 703/2 |
| 2012/0221302 | A1 | 8/2012 | Lewandowski et al. |
| 2013/0085730 | A1 | 4/2013 | Shaw et al. |
| 2013/0116993 | A1 | 5/2013 | Maliassov |
| 2013/0124178 | A1 | 5/2013 | Bowen et al. |
| 2013/0132049 | A1 | 5/2013 | Dogru |
| 2013/0311158 | A1* | 11/2013 | Dasari .................. G01V 99/005 703/10 |

OTHER PUBLICATIONS

Chen, Y. & Durlofsky, L. "Adaptive Local—Global Upscaling for General Flow Scenarios in Heterogeneous Formations" Transport in Porous Media, vol. 62, pp. 157-185 (2005) (Year: 2005).*
Aarnes, JE "On Numerical Methods for Multifield Problems and Fast Reservoir Performance Prediction" Ph.D. thesis, U. Bergen, Norway (2002) (Year: 2002).*
Aziz and Settari "Petroleum Reservoir Simulation" Applied Science Publishers, Ltd., London, 1979, pp. 337-342.
Coats et al. "Compositional and Black Oil Reservoir Simulation" SPE Reservoir Evaluation & Engineering, vol. 1, No. 4, Aug. 1998, pp. 372-379.
Fung et al. "A Fully-Implicit Fully-Coupled Well Model for Parallel Mega-Cell Reservoir Simulation" SPE 106331, Technical Symposium of Saudi Arabia Section, May 14-16, 2005, Dhahran, Saudi Arabia, pp. 1-10.
Holmes "Modeling Advanced Wells in Reservoir Simulation" Journal of Petroleum Technology, vol. 53, No. 11, Nov. 2001, pp. 54-60.
Jiang, "Techniques for Modeling Complex Reservoirs and Advanced Wells", A Dissertation Submitted to the Department of Energy Resources Engineering and the Committee on Graduate Studies of Stanford University, 2007, pp. 1-220.
Lu et al., "Productivity Formulas for a Partially Penetrating Vertical Well in a Circular Cylinder Drainage Volume", Mathematical Problems in Engineering, 2009, pp. 1-35, vol. 2009, Hindawi Publishing Corporation.
Muskat "The Flow of Homogenous Fluids Through Porous Media" McGraw-Hill, 1937, pp. 264-277.
Saad "Iterative Methods for Sparse Linear Systems" Society for Industrial and Applied Mathematics, Second Edition, Philadelphia, 2003, pp. 204-228.
Stern et al., "A Technique for Generating Reservoir Simulation Grids to Preserve Geologic Heterogeneity", The 1999 SPE Reservoir Simulation Symposium held in Houston, Texas, Feb. 14-17, 1999, pp. 1-29, SPE51942.
Weisstein, "Diagonal Matrix", Wolfram Mathworld, 2015, pp. 1-3, Wolfram Research Inc, http://mathworld.wolfram.com/DiagonalMatrix.html.
International Search Report and Written Opinion dated Jun. 16, 2017 of related application PCT/US2017/020327.
Fung, Larry SK, et al. "A Fully-Implicit Fully-Coupled Well Model for Parallel Mega-Cell Reservoir Simulation." SPE Technical Symposium of Saudi Arabia Section. SPE 106331, Society of Petroleum Engineers, Dhahran, Saudi Arabia, May 14, 2005, pp. 1-10.
Aarnes, JE. "On Numerical Methods for Multifield Problems and Fast Reservoir Performance Prediction" PH.D. thesis, U. Bergen, Norway (2002).
Cardoso, M., et al. "Development and Application of Reduced-Order Modeling Procedures for Subsurface Flow Simulation" Intl' J. Numerical Methods in Engineering, vol. 77, pp. 1322-1350 (2009).
Chen, Y. & Dorlofsky, L. "Adaptive Local-Global Upscaling for General Flow Scenarios in Heterogeneous Formations" Transport in Porous Media, vol. 62, pp. 157-185 (2005).
Chen, Y. et al. "A Coupled Local-Global Upscaling Approach for Simulating Flow in Highly Heterogeneous Formations" Advances in Water Resources, vol. 26, pp. 1041-1060 (2003).
International Search Report and Written Opinion, PCT/US2012/023284, dated May 28, 2013.
Li, D., et al. "Optimal Uplayering for Scaleup of MultiMillion Cell Geological Models" Coscity of Petroleum Engineers, SPE 62927; 2000.
Muskat "Physical Principles of Oil-Production" McGraw-Hill, 1949, pp. 204-215.

* cited by examiner $$\begin{bmatrix} \tilde{T}_{c,1} & T_{up,1} & 0 & 0 & 0 & 0 & 0 & 0 \\ T_{down,2} & \tilde{T}_{c,2} & T_{up,2} & 0 & 0 & 0 & 0 & 0 \\ 0 & T_{down,3} & \tilde{T}_{c,3} & T_{up,3} & 0 & 0 & 0 & 0 \\ 0 & 0 & T_{down,4} & \tilde{T}_{c,4} & T_{up,4} & 0 & 0 & 0 \\ 0 & 0 & 0 & . & . & . & 0 & 0 \\ 0 & 0 & 0 & 0 & . & . & . & 0 \\ 0 & 0 & 0 & 0 & 0 & T_{down,nz-1} & \tilde{T}_{c,nz-1} & T_{up,nz-1} \\ 0 & 0 & 0 & 0 & 0 & 0 & T_{down,nz} & \tilde{T}_{c,nz} \end{bmatrix} \begin{bmatrix} \Phi_1 \\ \Phi_2 \\ . \\ . \\ . \\ . \\ \Phi_{nz-1} \\ \Phi_{nz} \end{bmatrix} = \begin{bmatrix} \tilde{b}_1 \\ \tilde{b}_2 \\ . \\ . \\ . \\ . \\ \tilde{b}_{nz-1} \\ \tilde{b}_{nz} \end{bmatrix}$$

FIG. 14

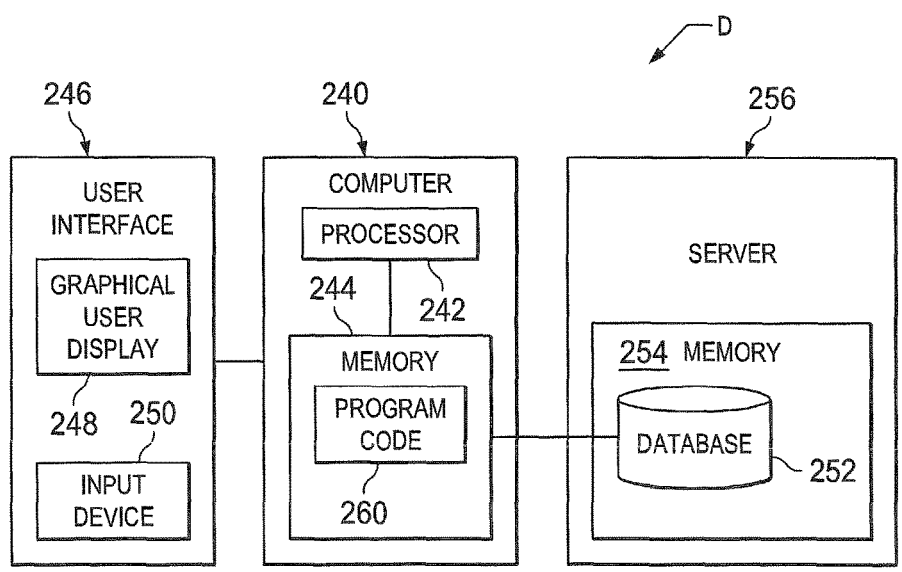

FIG. 16

$$A = \begin{bmatrix} b_1 & c_1 & 0 & 0 & 0 & 0 & 0 & 0 \\ a_2 & b_2 & c_2 & 0 & 0 & 0 & 0 & 0 \\ 0 & a_3 & b_3 & c_3 & 0 & 0 & 0 & 0 \\ 0 & 0 & a_4 & b_4 & c_4 & 0 & 0 & 0 \\ 0 & 0 & 0 & a_5 & b_5 & c_5 & 0 & 0 \\ 0 & 0 & 0 & 0 & a_6 & b_6 & c_6 & 0 \\ 0 & 0 & 0 & 0 & 0 & a_7 & b_7 & c_7 \\ 0 & 0 & 0 & 0 & 0 & 0 & a_8 & b_8 \end{bmatrix}$$

FIG. 17

$$\begin{bmatrix} b_1 & c_1 & 0 & 0 & 0 & 0 & 0 & 0 \\ a_2 & b_2 & c_2 & 0 & 0 & 0 & 0 & 0 \\ 0 & a_3 & b_3 & c_3 & 0 & 0 & 0 & 0 \\ 0 & 0 & a_4 & b_4 & c_4 & 0 & 0 & 0 \\ 0 & 0 & 0 & a_5 & b_5 & c_5 & 0 & 0 \\ 0 & 0 & 0 & 0 & a_6 & b_6 & c_6 & 0 \\ 0 & 0 & 0 & 0 & 0 & a_{n-1} & b_{n-1} & c_{n-1} \\ 0 & 0 & 0 & 0 & 0 & 0 & a_n & b_n \end{bmatrix} \begin{bmatrix} x_1 \\ x_2 \\ x_3 \\ . \\ . \\ . \\ x_{n-1} \\ x_n \end{bmatrix} = \begin{bmatrix} d_1 \\ d_2 \\ d_3 \\ . \\ . \\ . \\ d_{n-1} \\ d_n \end{bmatrix}$$

FIG. 18

$$\begin{bmatrix} T_{C1} & T_{E1} & 0 & PI_1 \\ T_{W2} & T_{C2} & T_{E2} & PI_2 \\ 0 & T_{W3} & T_{C3} & PI_3 \\ PI_1 & PI_2 & PI_3 & -PI_T \end{bmatrix} \begin{bmatrix} \Phi_1 \\ \Phi_2 \\ \Phi_3 \\ \Phi_W \end{bmatrix} = \begin{bmatrix} 0 \\ 0 \\ 0 \\ q_1 \end{bmatrix} \Bigg\}$$ FIG. 20C $$PI_T = \sum_{i=1}^{3} PI_i$$

FIG. 27

SEQUENTIAL FULLY IMPLICIT WELL MODEL WITH TRIDIAGONAL MATRIX STRUCTURE FOR RESERVOIR SIMULATION

CROSS-REFERENCE TO RELATED APPLICATIONS

The present application is a continuation in part of, and claims priority to, Applicant's, commonly owned U.S. patent application Ser. No. 14/040,930, filed Sep. 30, 2013, now U.S. Pat. No. 9,494,709, issued Nov. 15, 2016; and to U.S. patent application Ser. No. 13/023,728, filed Feb. 9, 2011, now U.S. Pat. No. 9,164,191, issued Oct. 20, 2015.

The present application is also related to commonly owned U.S. patent application Ser. No. 15/061,628, filed of even date herewith, entitled "Sequential Fully Implicit Well Model with Tridiagonal Matrix Structure for Reservoir Simulation," and having the same inventor as the present application.

BACKGROUND OF THE INVENTION

1. Field of the Invention

The present invention relates to computerized simulation of hydrocarbon reservoirs in the earth, and in particular to simulation of flow profiles along wells in a reservoir.

2. Description of the Related Art

Well models have played an important role in numerical reservoir simulation. Well models have been used to calculate oil, water and gas production rates from wells in an oil and gas reservoirs. If the well production rate is known, they are used to calculate the flow profile along the perforated interval of the well. With the increasing capabilities for measuring flow rates along the perforated intervals of a well, a proper numerical well model is necessary to compute the correct flow profile to match the measurements in a reservoir simulator.

It is well known that simple well models such as explicit or semi implicit models could be adequate if all reservoir layers communicated vertically for any vertical wells in a reservoir simulator. For these models, well production rate is allocated to the perforations in proportion to the layer productivity indices (or total mobility). Therefore, the calculations are simple and computationally inexpensive. The structure of the resulting coefficient matrix for the reservoir unknowns remains unchanged. Specifically, the coefficient matrix maintains a regular sparse structure. Therefore, any such sparse matrix solver could be used to solve the linear system for the grid block pressures and saturations for every time step for the entire reservoir simulation model.

However, for highly heterogeneous reservoirs with some vertically non-communicating layers, the above-mentioned well models cannot produce the correct physical solution. Instead, they produce incorrect flow profiles and in some occasions cause simulator convergence problems.

With the increasing sophistication of reservoir models, the number of vertical layers has come to be in the order of hundreds to represent reservoir heterogeneity. Fully implicit, fully coupled well models with simultaneous solution of reservoir and well equations have been necessary to correctly simulate the flow profiles along the well and also necessary for the numerical stability of the reservoir simulation. In order to solve the fully coupled system, generally well equations are eliminated first. This creates an unstructured coefficient matrix for the reservoir unknowns to be solved. Solutions of this type of matrices require specialized solvers with specialized preconditioners. For wells with many completions and many wells in a simulation model, this method has become computationally expensive in terms of processor time.

SUMMARY OF THE INVENTION

Briefly, the present provides a new and improved computer implemented method of solving well equations together with reservoir equations in a reservoir simulation model having formation layers having vertical fluid flow and flow barrier layers with no vertical fluid flow. The computer implemented method forms a reduced well model system for horizontal as well as multiple vertical wells in a reservoir simulation model by assembling as a single flow layer the flow layers having flow between the flow barriers in the reservoir model in the vicinity of the wells only. For a production rate specified well, the method then solves the reduced well model system by matrix computation (using a direct sparse matrix solver) for the bottom hole pressure of the well and reservoir unknowns for the grid blocks where well is going through (reduced well model system). This method is repeated for the well or wells in a reservoir simulator. Next, the method then solves the full reservoir simulation model by treating each well as having the determined bottom hole pressure, and based on a steady state volume balance relationship of the layer completion rates, formation pressures and transmissibilities to determine completion rates for the layers of the well or wells for the full reservoir model, and determine total rate for the well from the determined completion rates for the layers of the well or wells. The method then forms a record of the determined completion rates for the layers and the determined total rate for the well or wells. The simulator calculates the pressure distribution of multi-phase flow fluid saturations distribution in the reservoir by using the calculated perforation rates and the reservoir data assigned to the simulator grid blocks. The simulator is thus able to calculate pressure and saturation distribution within the reservoir with given production and injection rates at the wells at a given time.

The present invention provides a new and improved data processing system for forming a well model for horizontal as well as multiple vertical wells by reservoir simulation of a subsurface reservoir from a reservoir model having formation layers having fluid flow and flow barrier layers with no fluid flow. The data processing system includes a processor which performs the steps of solving by matrix computation the reduced well model system model for the bottom hole pressure of the well or wells and reservoir unknowns around the well or wells and solving the full reservoir model by treating the well(s) as having the determined bottom hole pressure, and based on a steady state volume balance relationship of the layer completion rates, formation pressures and transmissibilities to determine completion rates for the layers of the well(s) for the full reservoir model. The processor also determines total rate for the well(s) from the determined completion rates for the layers of the well(s). The data processing system also includes a memory forming a record the determined completion rates for the layers and the determined total rate or rates.

The present invention further provides a new and improved data storage device having stored in a computer readable medium computer operable instructions for causing a data processor in forming a well model for horizontal as well as multiple vertical wells by reservoir simulation of a subsurface reservoir from a reservoir model having formation layers having fluid flow and flow barrier layers with no fluid flow to perform steps of solving by matrix computation the reduced well model system model for the bottom hole pressure of the well or wells and reservoir unknowns and solving the full reservoir model by treating the well(s) as having the determined bottom hole pressure, and based on a steady state volume balance relationship of the layer completion rates, formation pressures and transmissibilities to determine completion rates for the layers of the well(s) for the full reservoir model. The instructions stored in the data storage device also include instructions causing the data processor to determine the total rate for the well(s) from the determined completion rates for the layers of the well or wells, and form a record the determined completion rates for the layers and the determined total rate for the well(s).

BRIEF DESCRIPTION OF THE DRAWINGS

FIG. 14 is a schematic diagram of a linear system of equations with a tridiagonal coefficient matrix for a constant bottom hole pressure well model for a one dimensional reservoir simulator with a vertical well for processing according to the present invention.

FIG. 16 is a schematic diagram of a computer network for a sequential fully implicit well model for reservoir simulation according to the present invention.

FIG. 17 is a schematic diagram of a tridiagonal coefficient matrix.

FIG. 18 is a schematic diagram of a linear system of equations with a tridiagonal coefficient matrix.

FIG. 20C is a schematic diagram of a linear system of equations for the reduced horizontal well model of FIG. 20B.

FIG. 27 is a schematic diagram of a linear system of equations for a simplified two well, three-dimensional reservoir model.

DETAILED DESCRIPTION OF THE PREFERRED EMBODIMENTS

Figure 1A:
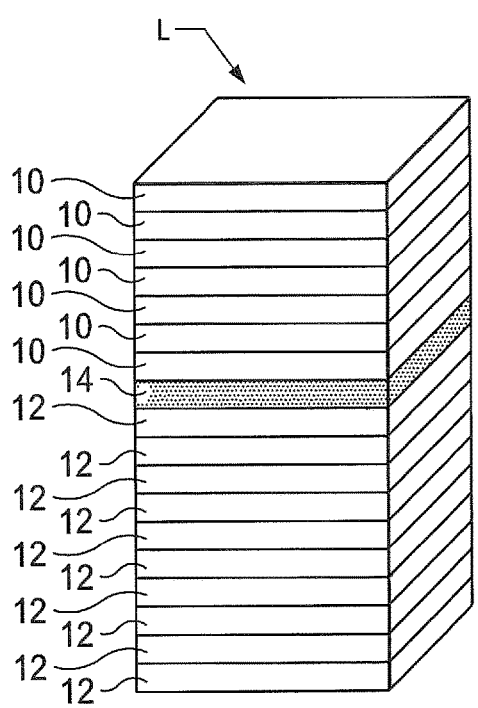
FIGS. 1A and 1B are schematic diagrams for a well model in a reservoir simulator of multiple subsurface formation layers above and below a flow barrier in a reservoir being formed into single layers according to the present invention.

By way of introduction, the present invention provides a sequential fully implicit well model for reservoir simulation. Reservoir simulation is a mathematical modeling science for reservoir engineering. The fluid flow inside the oil or gas reservoir (porous media) is described by a set of partial differential equations. These equations describe the pressure (energy) distribution, oil, water and gas velocity distribution, fractional volumes (saturations) of oil, water, gas at any point in reservoir at any time during the life of the reservoir which produces oil, gas and water. Fluid flow inside the reservoir is described by tracing the movement of the component of the mixture. Amounts of components such as methane, ethane, $CO_2$, nitrogen, $H_2S$ and water are expressed either in mass unit or moles.

Since these equations and associated thermodynamic and physical laws describing the fluid flow are complicated, they can only be solved on digital computers to obtain pressure distribution, velocity distribution and fluid saturation or the amount of component mass or mole distribution within the reservoir at any time at any point. This only can be done by solving these equations numerically, not analytically. Numerical solution requires that the reservoir be subdivided into computational elements (cells or grid blocks) in the area and vertical direction (x, y, z—three dimensional spaces) and time is sub-divided into intervals of days or months. For each element, the unknowns (pressure, velocity, volume fractions, etc.) are determined by solving the complicated mathematical equations.

In fact, a reservoir simulator model can be considered the collection of rectangular prisms (like bricks in the walls of a building). The changes in the pressure and velocity fields take place due to oil, water and gas production at the wells distributed within the reservoir. Simulation is carried out over time (t). Generally, the production or injection rate of each well is known during the production history of a reservoir. However, since the wells go through several reservoir layers (elements), the contribution of each reservoir element (well perforation) to the production is calculated by different methods. This invention deals with the calculation of how much each well perforation contributes to the total well production. Since these calculations can be expensive and very important boundary conditions for the simulator, the proposed method suggests a practical method to calculate correctly the flow profiles along a well trajectory. As will be described, it can be shown that some other methods used will result in incorrect flow profiles which cause problems in obtaining the correct numerical solution and can be very expensive computationally.

Nomenclature $\Delta x$, $\Delta y$, $\Delta z$=Grid dimension in x, y and z directions
$k_x$, $k_y$, $k_z$=permeability in x, y and z directions
p=pressure
$\rho$=Fluid (oil) density
g=gravitational constant
z=vertical depth from a datum depth
$r_0$=Peaceman's radius=0.2 $\Delta x$
$r_w$=wellbore radius
$T_x$, $T_y$, $T_z$=Rock Transmissibility in the x, y and z directions The equations describing a general reservoir simulation model and indicating the well terms which are of interest in connection with the present invention are set forth below in Equation (1):

$$\Delta_x \sum_{j=1}^{n_p} T_x \rho_{ij} \lambda_j \Delta \Phi_j + \Delta_y \sum_{j=1}^{n_p} T_y \rho_{ij} \lambda_j \Delta \Phi_j +$$

$$\Delta_z \sum_{j=1}^{n_p} T_z \rho_{ij} \lambda_j \Delta \Phi_j + \sum_{j=1}^{n_p} q_{ij} = \frac{\Delta_t n_i}{\Delta t}$$

$$i = 1, \ldots n_c \ldots$$

(1)

where $T_x$, $T_y$, $T_z$ are the rock transmissibilities in the x, y and z directions as defined in Equation below), j stands for the number of fluid phases, $n_p$ is the total number of fluid phases, usually 3 (oil, water and gas), $\Sigma$ is the summation term, $\rho_{i,j}$ is the density of component t in the fluid phase j, $\lambda_j$ is the mobility of the phase j (Equation 6), $\Phi_j$ is the fluid potential (datum corrected pressure) of fluid phase j, similarly $\Delta_x$ is the difference operator in x direction, $\Delta_y$ is the difference operator in y direction, and $\Delta_z$ is the different operator in z direction of the reservoir, $q_{i,j}$ is the volumetric well term (source or sink) for the component i for grid block (cell) located at (x,y,z), $\Delta_t$ is the difference operator in time domain, $n_i$ is the total number of moles for component i, and $n_c$ is the total number of components in the fluid system (methane, ethane, propane, $CO_2$, etc.).

Equation (1) is a set of coupled nonlinear partial differential equations describing the fluid flow in the reservoir. In the above set of equations $n_i$ represents the ith component of the fluids. $n_c$ is the total number of components of the hydrocarbons and water flowing in the reservoir. Here a component means such as methane, ethane, propane, $CO_2$, $H_2S$, water, etc. The number of components depends on the hydrocarbon water system available for the reservoir of interest. Typically, the number of components can change from 3 to 10. Equation (1) combines the continuity equations and momentum equations.

In Equation (1) $q_{i,j}$ is the well perforation rate at location at well location at well location x,y,z for component i and x,y,z is the center of the grid block (cell) number. Again, the calculation of this term from the specified production rates at the well head is the subject of the present invention.

In addition to the differential equations in Equation (1), pore volume constraint at any point (element) in the reservoir must be satisfied:

$$V_p(p(x, y, z)) = \sum_{j=1}^{n_p} \frac{N_j}{\rho_j}$$

(2)

where $V_p$ is the grid block pore volume, p (x, y, z) is the fluid pressure at point x, y, z, $N_j$ is the total number of moles in fluid phase j, $\rho_j$ is the density of fluid phase j.

There are $n_c$+1 equations in Equations (1) and (2), and $n_c$+1 unknowns. These equations are solved simultaneously with thermodynamics phase constraints for each component i by Equation (3):

$$f_i^V(n_{iV}; n_1, n_2, \ldots n_c, p, T) = f_i^L(n_{iL}; n_1, n_2, \ldots n_c, p, T)$$

(3)

where $f_i$ is the component fugacity, superscript V stands for the vapor phase, L stands for the liquid phase, $n_i$ is the total number of moles of component i, P is the pressure and T represents the temperature.

In the fluid system in a reservoir typically there are three fluid phases: oil phase, gas phase and water phase. Each fluid phase may contain different amounts of components described above based on the reservoir pressure and temperature. The fluid phases are described by the symbol j. The symbol j has the maximum value 3 (oil, water and gas phases). The symbol $n_p$ is the maximum number of phases (sometimes it could be 1 (oil); 2 (oil and gas or oil and water); or 3 (oil, water and gas)). The number of phases $n_p$ varies based on reservoir pressure (p) and temperature (T). The symbol $n_i$ is the number of moles of component i in the fluid system. The symbol $n_c$ is the maximum number of components in the fluid system. The number of phases and fraction of each component in each phase $n_{i,j}$ as well as the phase density $\rho_i$ and $\rho_{i,j}$ are determined from Equation (3). In Equation (3), V stands for the vapor (gas) phase and L stands for liquid phase (oil or water).

Total number of moles in a fluid phase j is defined by:

$$N_j = \sum_{i=1}^{n_c} n_{i,j}$$

(4)

Total component moles are defined by Equation (5).

$$N_i = \sum_{i=1}^{n_p} n_{i,j}$$

(5)

Phase mobility in Equation (1), the relation between the phases, definition of fluid potential and differentiation symbols are defined in Equations (6) through (9).

$$\lambda_j = k_{r,j}/\mu_j \quad (6)$$

In Equation (6), the numerator defines the phase relative permeability and the denominator is the phase viscosity.

The capillary pressure between the phases are defined by Equation (7) with respect to the phase pressures:

$$P_c(s_j, s_{j'}) = P_j - P_{j'} \quad (7)$$

The fluid potential for phase j is defined by:

$$\Phi_j = P_j - g\rho_j z \quad (8)$$

Discrete differentiation operators in the x, y, and z directions are defined by:

$$\Delta_x U = U_{x+\Delta x} - U_x, \Delta_y = U_{y+\Delta y} - U_y, \Delta_{z+\Delta z} = U_{z+\Delta z} - U_z, \Delta_t = U_{t+\Delta t} - U_t, \quad (9)$$

where $\Delta$ defines the discrete difference symbol and U is any variable.

Equations (1), together with the constraints and definitions in Equations (3) through (9), are written for every grid block (cell) in a reservoir simulator using control volume finite difference method (some of the grid blocks may include wells). Resulting equations are solved simultaneously. This is done to find the distribution of $n_i$ (x, y, x, and t), P (x, y, z, and t) for the given well production rates $q_T$ for each well from which the component rates in Equation (1) are calculated according to the present invention using the new well model formulation. In order to solve Equations (1) and (2), reservoir boundaries in (x, y, z) space, rock property distribution K (x, y, z), rock porosity distribution and fluid properties and saturation dependent data is entered into simulation.

According to the present invention and as will be described below, a reduced well model system is formed which yields the same determination of a calculated bottom hole pressure as complex, computationally time consuming prior fully coupled well models.

Figure 1B:
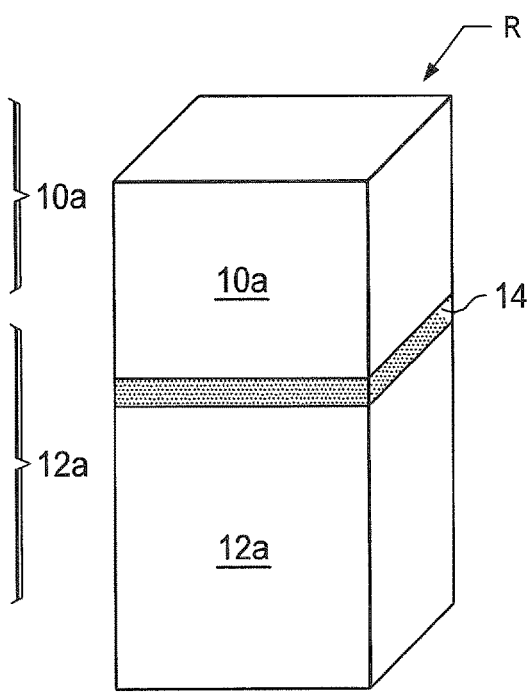
Figure 2A:
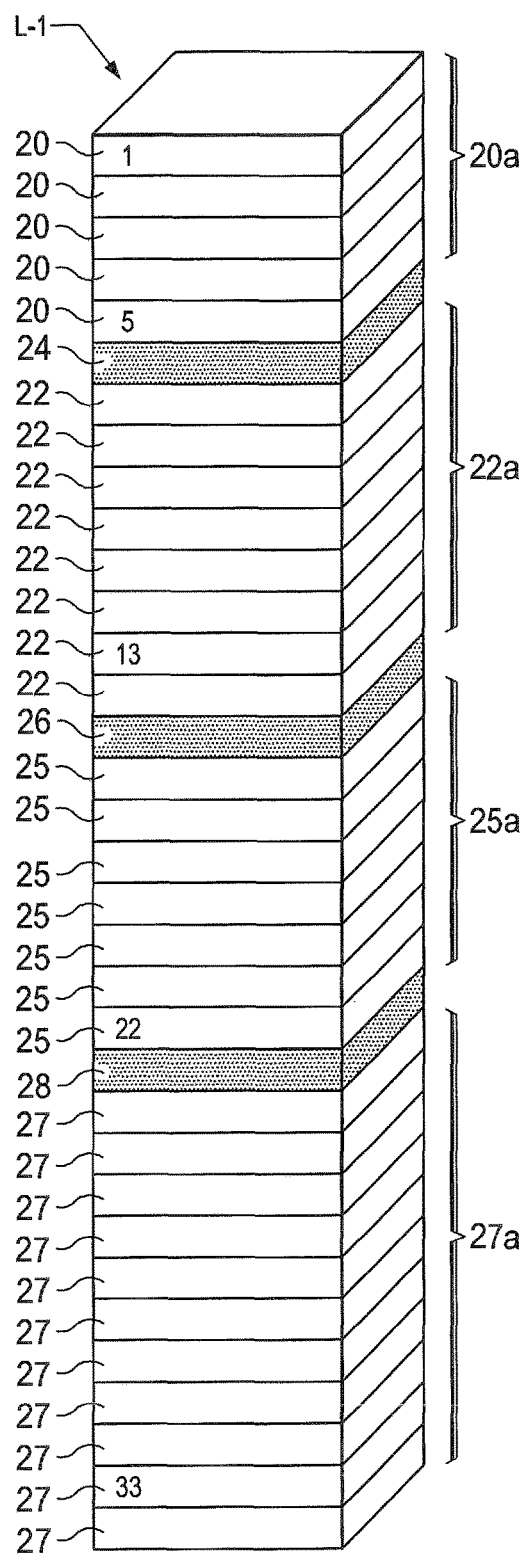
FIGS. 2A and 2B are schematic diagrams for a well model in a reservoir simulator of multiple subsurface formation layers above and below several vertically spaced flow barriers in a reservoir being formed into single layers according to the present invention.
Figure 2B:
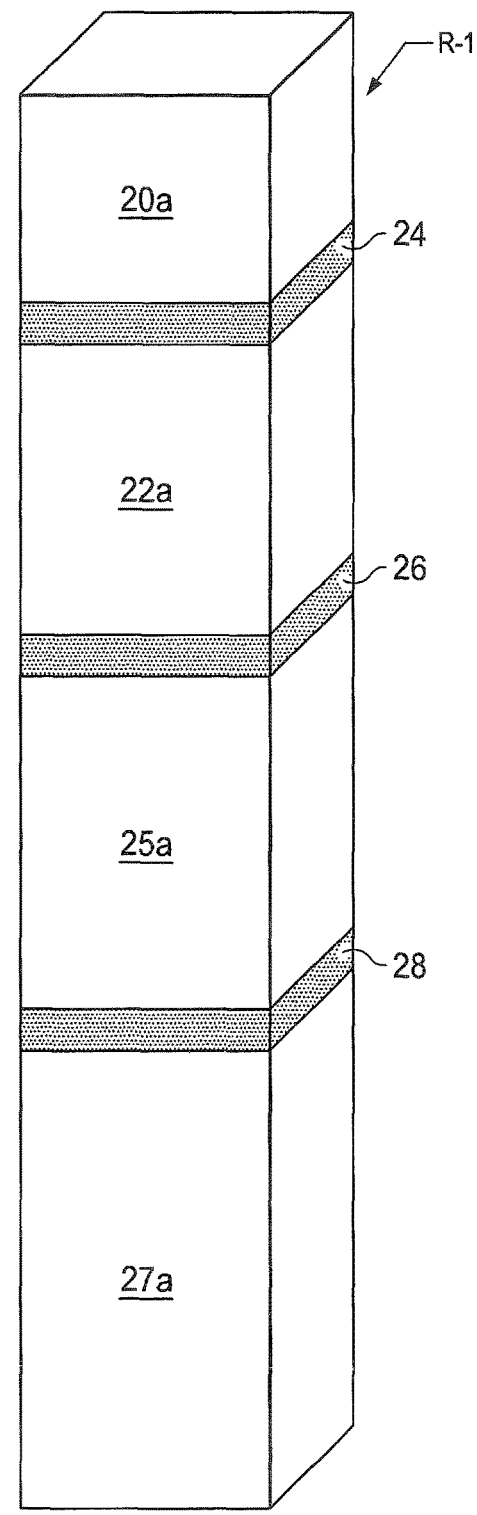

According to the present invention, it has been determined that for the grid blocks where the well trajectory is going through where a number of formation layers communicate vertically, the communicating layers can be combined for processing into a single layer, as indicated schematically in FIGS. 1 and 2 for the well model. This is done by identifying the vertical flow barriers in the reservoir for the well cells, and combining the layers above and below the various flow barriers of the well cells. Therefore, the full well model system is reduced to a smaller dimensional well model system with many fewer layers for incorporation into a well model for processing.

As shown in FIG. 1, a well model L represents in simplified schematic form a complex subsurface reservoir grid blocks (cells) where the well is going through which is composed of seven individual formation layers 10, each of which is in flow communication vertically with adjacent layers 10. The model L includes another group of ten formation layers around the well 12, each of which is in flow communication vertically with adjacent layers 12. The groups of formation layers 10 and 12 in flow communication with other similar adjacent layers in model L are separated as indicated in FIG. 1 by a fluid impermeable barrier layer 14 which is a barrier to vertical fluid flow.

According to the present invention, the well model L is reduced for processing purposes to a reduced or simplified well model R (FIG. 1A) by lumping together or combining, for the purposes of determining potential $\Phi$ and completion rates, the layers 10 of the well model L above the flow barrier 14 into a composite layer 10a in the reduced model R. Similarly, the layers 12 of the well model L below the flow barrier 14 are combined into a composite layer 12a in the reduced well model R.

Similarly, as indicated by FIG. 2, a reservoir model L-1 is composed of five upper individual formation layers 20, each of which is in flow communication vertically with adjacent layers 20. The model L-1 includes another group of seven formation layers 22, each of which is in flow communication vertically with adjacent layers 22. The groups of formation layers 20 and 22 in flow communication with other similar adjacent layers in model L-1 are separated as indicated in FIG. 2 by a fluid impermeable barrier layer 24 which is a barrier to vertical fluid flow. Another group of nine formation layers 25 in flow communication with each other are separated from the layers 22 below a fluid barrier layer 26 which is a vertical fluid flow barrier as indicated in the model L-1. A final lower group of ten formation layers 27 in flow communication with each other are located below a fluid flow barrier layer 28 in the model L-1.

According to the present invention, the well model L-1 is reduced for processing purposes to a reduced or simplified model R-1 (FIG. 2A) by lumping together or combining, for the purposes of determining well layer potential $\Phi$ and completion rates, the layers 20 of the model L-1 above the flow barrier 24 into a composite layer 20a in the reduced model R. Similarly, other layers 22, 25, and 27 of the model L-1 below flow barriers 24, 26 and 28 are combined into composite layers 22a, 25a, and 27a in the reduced model R-1.

The reduced well model systems or well models according to the present invention are solved for the reservoir unknowns and the well bottom hole pressure. Next, the wells in the full reservoir simulation model system are treated as specified bottom hole well pressure and solved implicitly for the reservoir unknowns. The diagonal elements of the coefficient matrix and the right hand side vector for the reservoir model are the only components which are modified in processing according to the present invention, and these are only slightly modified. A regular sparse solver technique or methodology is then used to solve for the reservoir unknowns. The perforation rates are computed by using the reservoir unknowns (pressures and saturations). These rates are then summed up to calculate the total well rate. The error between the determined total well rate according to the present invention and the input well rate will diminish with the simulator's non-linear Newton iterations for every time step.

The flow rates calculated according to the present invention also converge with the flow rates calculated by the fully coupled simultaneous solution for the entire reservoir simulation model including many wells. Because the present invention requires solving a small well system model, the computational cost is less. It has been found that the methodology of the present invention converges if the reduced well system is constructed properly, by using upscaling properly when combining communicating layers.

Figure 3:
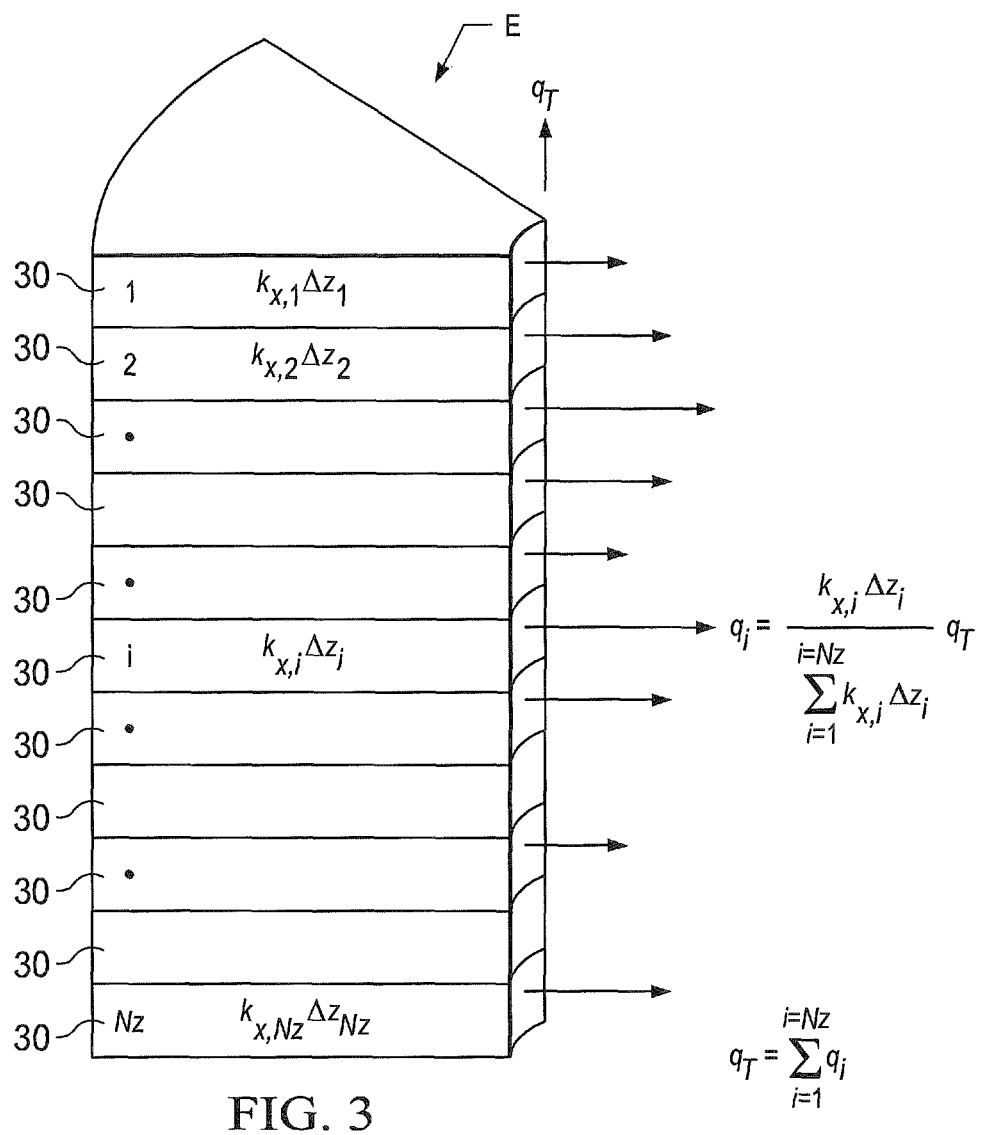
FIG. 3 is a schematic diagram of a well model for simulation based on an explicit model methodology illustrated in radial geometry.

It is well known that simple vertical well models such as explicit or semi-implicit models have been generally adequate if all reservoir layers communicate vertically. As shown in FIG. 3, an explicit well model E is composed of a number Nz of reservoir layers 30 in vertical flow communication, each layer having a permeability $k_{x,i}$ (here i represents the layer number, not a component) and a thickness $\Delta z$, and a perforation layer rate $q_i$ defined as indicated in FIG. 3. The total production rate $q_T$ for the explicit model E is then the sum of the individual production rates $q_i$ for the Nz layers of the explicit model as indicated in Equation (3) in the same Figure.

For explicit models, the well production rate is allocated to the perforations in proportion to the layer productivity indices (or total mobility). Therefore, the calculations are simple. The resulting coefficient matrix for the unknowns remains unchanged, i.e., maintains a regular sparse structure, as shown in matrix format in FIG. 12. Therefore, any sparse matrix solver can be used to solve the linear system for the grid block pressures and saturations for every time step.

Well Models

The methodology of several vertical well models of a reservoir simulator is presented based also for simplicity on a simple fluid system in the form of flow of a slightly compressible single phase oil flow inside the reservoir. However, it should be understood that the present invention general in applicability to reservoirs, and can be used for any number of wells and fluid phases in a regular reservoir simulation model.

Figure 6:
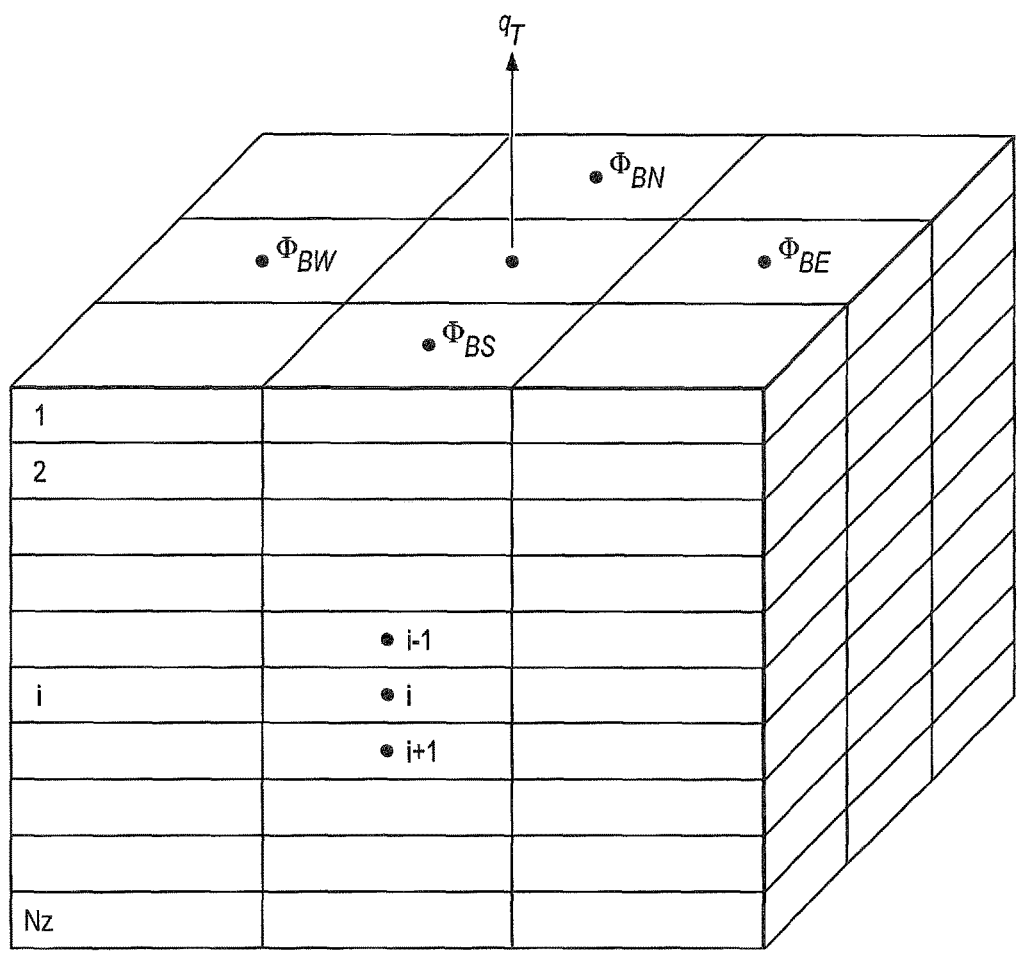
FIG. 6 is a schematic diagram of a finite difference grid system for the well models of FIGS. 3 and 4.

FIG. 6 illustrates the finite difference grid G used in this description for a vertical well model. As seen, a well is located at the center of the central cell in vertical directions. The models set forth below also contemplate that the well is completed in the vertical Nz directions, and the potentials in the adjacent cells:

$$\Phi_{BW}, \Phi_{BE}, \Phi_{BN}, \Phi_{BS}$$

are constants and known from the simulation run (previous time step or iteration value). Here subscript B refers to "Boundary", W indicates west neighbor, E stands for East neighbor, and N and S stand for north and south respectively. Again describes the fluid potential (datum corrected pressure).

As can be seen in FIG. 6, the well is penetrating a number of reservoir layers in the vertical direction represented by the index I, for i=1, 2, 3 . . . Nz, with Nz is being the total number of vertical layers in the reservoir model. For each layer i, there are four neighboring cells at the same areal plane (x, y). These neighboring cells are in the East-West (x direction) and North-South (y direction).

The potential Φ of the East, West, North and South neighbors are known from the simulator time step calculations, and those potentials are set in that they are assumed not to change over the simulator time step. The vertical potential variations at the well location are then considered, but neighbor potentials which can vary in the vertical direction but are assumed to be known.

The steady state volume balance equation for the cell (i) in FIG. 6 is as follows:

$$T_{wi}(\Phi_{Bw}-\Phi_i)+T_{Ei}(\Phi_{BE}-\Phi_i)+T_{Ni}(\Phi_{EN}-\Phi_i)+T_{Si}(\Phi_{BS}-\Phi_i)+T_{Up,i}(\Phi_{i-1}-\Phi_i)+T_{Down,i}(\Phi_{i+1}-\Phi_i)-q_i=0 \quad (10)$$

In Equation (10), T represents the transmissibility between the cells. The subscripts W, E, N, and S denote west, east, south and north directions, and (i) represent the cell index.

The transmissibilities between cells for three directions are defined by Equation (11) below:

$$T_{wi} = k_{x,i-1/2}\frac{\Delta y_i \Delta z_i}{0.5(\Delta x_{i-1} + \Delta x_i)} \quad (11)$$

-continued $$T_{E,i} = k_{x,i+\frac{1}{2}}\frac{\Delta y_i \Delta z_i}{0.5(\Delta x_{i+1} + \Delta x_i)}$$

$$T_{Ni} = k_{y,i-1/2}\frac{\Delta x_i \Delta z_i}{0.5(\Delta y_{i-1} + \Delta y_i)}$$

$$T_{S,i} = k_{y,i+\frac{1}{2}}\frac{\Delta x_i \Delta z_i}{0.5(\Delta y_{i+1} + \Delta y_i)}$$

$$T_{Up,i} = k_{z,i-1/2}\frac{\Delta x_i \Delta y_i}{0.5(\Delta z_{i-1} + \Delta z_i)}$$

$$T_{Down,i} = k_{z,i+1/2}\frac{\Delta x_i \Delta y_i}{0.5(\Delta z_{i+1} + \Delta z_i)}$$

In the above Equations (11), $\Delta x_i$ is the grid block size (cell size) in the x direction for the grid block (cell) number i. Similarly, $\Delta y_i$ is the grid block size (cell size) in the y direction for the grid block (cell) number I, and $\Delta z_i$ is the grid block size (cell size) or grid layer thickness in the z direction for the grid block (cell) number i. $K_{z,i-1/2}$ is the vertical permeability at the interface of the cells i and i−1. Similarly, $K_{z,i+1/2}$ is the vertical permeability at the interface of the cells i and i+1. As seen in FIG. 6, the cell i is at the center, i+½ interface between the cell i and i+1. For convenience the subscript j is dropped while expressing East-West flow. Similarly (i, j−1) is the north neighbor of the central cell (i, j). Therefore, the notation (i, j−½) is the interface between the central cell and north neighbor in the y direction.

The same notation is carried out for the south neighbor: (i, j+½) denotes the interface between the central cell (i, j) and south neighbor (i, j+1), in the y direction. For convenience in the above equations, subscript i is dropped while expressing y (or j) direction. As is evident, transmissibilities in Equation (11) are defined in a similar manner In FIG. 14, the diagonal terms $\tilde{T}_{c,i}$ are defined by Equation (17a) below, and the transmissibilities between cells for three directions are as defined in Equations 11, as set forth above.

The term $\tilde{b}_i$ in the FIG. 14 (right hand side) are expressed by Equation (17b) in the text. It is extracted here as follows:

$$\tilde{b}_i = -(PI_i\Phi_w + T_{wi}\Phi_{Bw} + T_{Ei}\Phi_{BE} + T_{Ni}\Phi_{BN} + T_{Si}\Phi_{BS})$$

where i=1, 2, . . . Nz, with Nz again being the total number of grids in the vertical directions, the number of vertical layers. In this extraction of Equation (17b), PI, the layer productivity index is defined by Equation (17) and the $\Phi_B$ potential terms are the known boundary potentials at boundaries of the neighbor cells to the west, east, north and south of the central cell. As is conventional, the terms, cell and grid block are used interchangeably.

Conventional well models can be generally classified in three groups: (a) the Explicit Well Model; (b) the Bottom Hole Pressure Specified Well Model; and the Fully Implicit Well Model (Aziz K, Settari A, Petroleum Reservoir Simulation, Applied Science Publishers Ltd, London 1979). For a better understanding of the present invention, a brief review of each well model is presented.

Explicit Well Model

For an explicit well model, the source term $q_i$ in Equation (10) is defined according to Equation (12) by:

$$q_i = \frac{k_{x,i}\Delta z_i}{\sum_{i=1}^{i=Nz} k_{x,i}\Delta z_i} \quad (12)$$

where $q_i$ is the production rate for cell (grid block) i where the well is going through and perforated.

Substituting Equation (12) into Equation (10) for cell i results in $$T_{Up,i}\Phi_{i-1}+T_{C,i}\Phi_i+T_{Down,i}\Phi_{i+1}=b_i \qquad (13)$$

where $$T_{c,i}=-(T_{Up,i}+T_{down,i}+T_{Wi}+T_{Ei}+T_{Ni}+T_{Si}) \qquad (14a)$$

and $$b_i = \frac{k_{x,i}\Delta z_i}{\sum_{i=1}^{i=Nz} k_{x,i}\Delta z_i} q_T - (T_{Wi}\Phi_{BW} + T_{Ei}\Phi_{BE} + T_{Ni}\Phi_{BN} + T_{Si}\Phi_{BS}) \qquad (14b)$$

Figure 12:
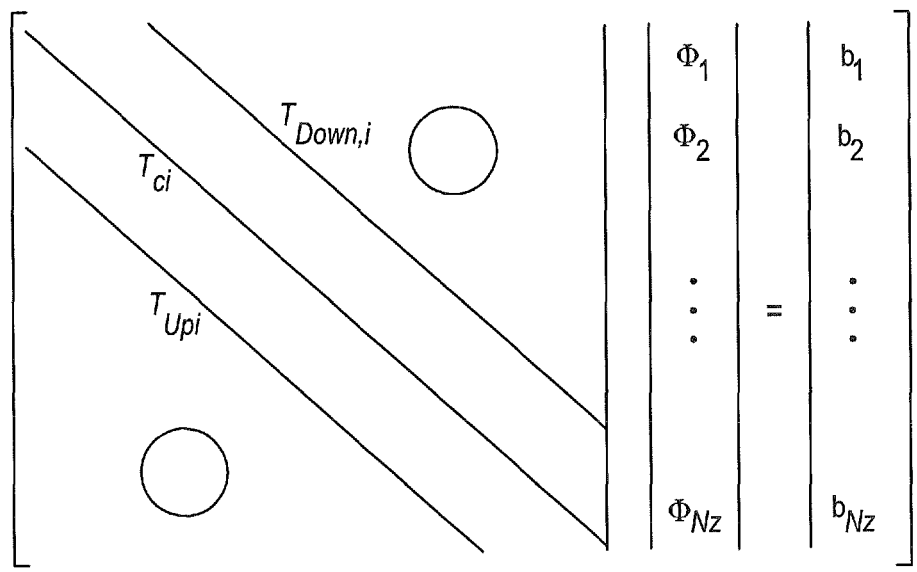
FIG. 12 is a schematic diagram of a linear system of equations with a tridiagonal coefficient matrix for an explicit well model for a one dimensional reservoir simulator with a vertical well

Writing Equation (13) for all the cells i=1, Nz around the well for the well cells only results in a linear system of equations with a tridiagonal coefficient matrix of the type illustrated in FIG. 12, which can be written in matrix vector notation as below:

$$A_{RR}\vec{\Phi}_R = \vec{b}_R \qquad (15)$$

In Equation (15), $A_{RR}$ is a (Nz×Nz) tridiagonal matrix, and $\Phi_R$ and $b_R$ are (Nz×1) vectors. Equation (15) is solved by computer processing for the reservoir unknown potentials $\Phi_R$ grid blocks where well is going through by a tridiagonal linear system solver such as the Thomas algorithm.

Tridiagonal Matrices and Systems

Tridiagonal Matrices are the matrices with only three diagonals in the middle, with real or complex number as the entries in the diagonals. These diagonals are called "lower diagonal", "central diagonal" and "upper diagonal". The remaining elements or entries of a tridiagonal matrix are zeros. For example, FIG. 17 illustrates a tridiagonal matrix A of 8×8 matrix dimensions (or order n=8). In the FIG. 17, elements of A; the ith element of A, namely $a_1, a_2, a_3, a_i$, i=1, 8, represents the lower diagonal; $b_1, b_2, b_3, b_i$, the central diagonal; and $c_1, c_2, c_3, c_7$, the upper diagonal elements.

An example tridiagonal system of equations is illustrated in FIG. 18. Solution of a linear system of equations with a Tridiagonal Matrix such as defined above and shown in FIG. 18 is easily solved by Gaussian elimination. An example of a solution of equations in this manner is contained at: https://en.wikipedia.org/wiki/Tridiagonal_matrix_algorithm Thus the solution for x, as shown below and in FIG. 18 performed by solving the matrix relationships of Equations (16a) through (16e) as follows:

$$c'_i = \begin{cases} \dfrac{c_i}{b_i}; & i = 1 \\ \dfrac{c_i}{b_i - a_i c'_{i-1}}; & i = 2, 3, \ldots, n-1 \end{cases} \qquad (16a)$$

$$b'_i = 1; \quad i = 1, 2, \ldots, n \qquad (16b)$$

$$d'_i = \begin{cases} \dfrac{d_i}{b_i}; & i = 1 \\ \dfrac{d_i - a_i d'_{i-1}}{b_i - a_i c'_{i-1}}; & i = 2, 3, \ldots, n. \end{cases} \qquad (16c)$$

$$x_n = d'_n \qquad (16d)$$

$$x_i = d'_i - c'_i x_{i+1}; \quad i = n-1, n-2, \ldots, 1. \qquad (16e)$$

Bottomhole Pressure Specified Well Model $\Phi_w$ is the uniform potential along the wellbore open to production using conventional techniques according to techniques explained in the literature, such as the textbooks by Muskat "Physical Principles of Oil Production", McGraw-Hill Book Co. (1949) and "The Flow of Homogeneous Fluids Through Porous Media", McGraw-Hill Book Co. (1937). For the purposes of modeling in the present context, the friction pressure drop along the well is considered negligible. Assuming that $\Phi_w$ is known (or specified), the oil rate from the perforation is calculated by Equation (17) as follows:

$$q_i = PI_i(\Phi_i - \Phi_W) \qquad (17)$$

$$= \frac{2\pi k_{x,i}\Delta z_i}{\ln(r_{o,i}/r_w)}(\Phi_i - \Phi_W)$$

where $PI_i$ is the layer productivity index, $\Phi w$ is the specified bottom hole potential (datum corrected pressure), $\Phi i$ is the reservoir grid block pressure where well is going through for grid block (cell) i, $r_{o,i}$ is called Peaceman's well block radius for grid block i defined as $0.2\Delta x$, $r_w$ is the radius of the well.

The variables in Equation (17) are explained in the Nomenclature section above. Substituting Equation (17) into Equation (10) and collecting the terms for the cell i, for cell i the following result occurs:

$$T_{Up,i}\Phi_{i-1}+T_{C,i}\Phi_i+T_{Down,i}\Phi_{i+1W}=b_i \qquad (18)$$

Let $$T_{ci}=-(T_{Up,i}+T_{down,i}+T_{Wi}+T_{Ei}+T_{Ni}++T_{Si}+PI_i) \qquad (18a)$$

$$b_i=-(PI_i\Phi_W+T_{Wi}\Phi_{BW}+T_{Ei}\Phi_{BE}+T_{Ni}\Phi_{BN}+T_{Si}\Phi_{BS}) \qquad (18b)$$

Equation (18) when written for all the grid blocks i=1, Nz results in a matrix system illustrated in FIG. 14. The matrix of FIG. 14 for the bottom hole pressure specified well model can be seen to be similar to the matrix of FIG. 12, and in a comparable manner Equation (18) is similar to Equation (13). The bottom hole pressure specified well model can be easily solved by matrix computer processing with a tridiagonal equation solver methodology.

Fully Implicit Well Model

Total production rate $q_T$ for a well according to a fully implicit well model is specified according to Equation (19).

$$q_T - \sum_{i=1}^{i=Nz} PI_i(\Phi_i - \Phi_W) = 0.0 \qquad (19)$$

The individual completion rate $q_i$ is calculated by Equation (17). For the implicit well model, the wellbore potential $\Phi_W$ is assumed constant throughout the well but it is unknown.

Substituting Equation (19) into Equation (10) and collecting the terms for the cell i for cell (i) arrives at the following expression:

$$T_{Up,i}\Phi_{i-1}+T_{C,i}\Phi_i+T_{Down,i}\Phi_{i+1W}-PI_i\Phi_W=b_i \qquad (20)$$

Let $$T_{ci}=-(T_{Up,i}+T_{down,i}+T_{Wi}+T_{Ei}+T_{Ni}+PI_i) \qquad (20A)$$

$$b_i=-(T_{Wi}\Phi_{BW}+T_{Ei}\Phi_{BE}+T_{Ni}\Phi_{BN}+T_{Si}\Phi_{BS}) \qquad (20B)$$

Figure 13:
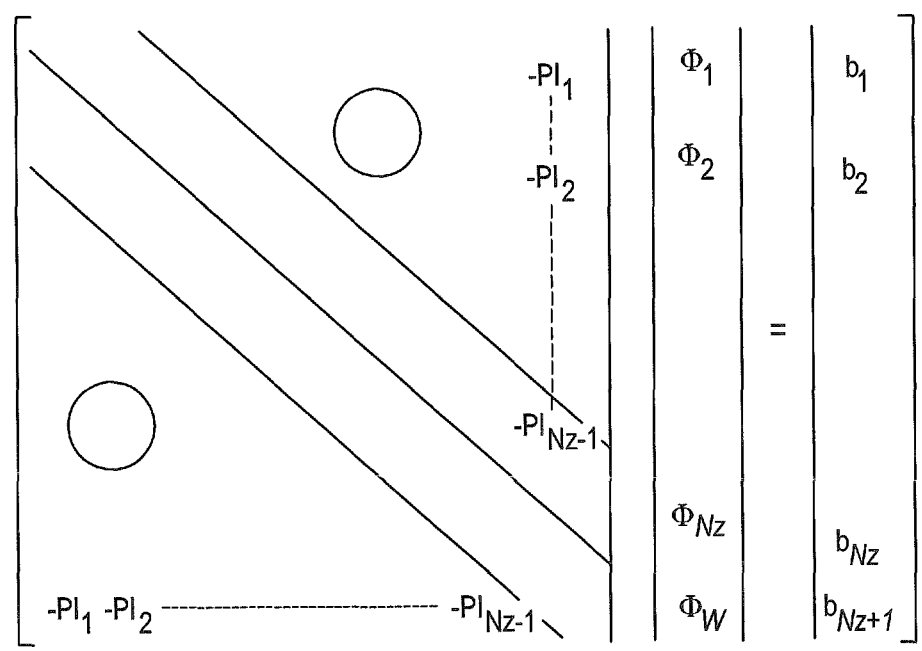
FIG. 13 is a schematic diagram of a linear system of equations with a tridiagonal coefficient matrix for a fully implicit well model for a one dimensional reservoir simulator with a vertical well

Writing Equation (20) for all cells yields a linear system of equations with the form illustrated in FIG. 13 upper diagonal solid line represents $T_{Up,i}$ as defined by Equation (11), and the lower diagonal solid line describes the elements called $T_{Down,i}$ described in Equation (11). The central term $T_{C,I}$ is defined by Equation (20A) and right hand side $b_i$ is defined by Equation (20B).

The linear system of the matrix (Equation 20) of FIG. 13 can be represented in vector matrix notation as below:

$$\begin{bmatrix} A_{RR} & A_{RW} \\ A_{WR} & A_{WW} \end{bmatrix} \begin{bmatrix} \vec{\Phi}_R \\ \Phi_W \end{bmatrix} = \begin{bmatrix} \vec{b}_R \\ b_W \end{bmatrix} \qquad (21)$$

In Equation (21), $A_{RR}$ is a (Nz×Nz) tridiagonal matrix, $A_{RW}$ is a (Nz×1) vector (reservoir PI's), $A_{WR}$ is a (1×Nz) vector (s) and $A_{WW}$ is (1×1) scalar. For this example:

$$A_{ww} = \sum_{i=1}^{N_z} PI_{NZ}$$

Writing in algebraic form:

$$A_{RR}\vec{\Phi}_R + A_{Rw}\Phi_W = \vec{b}_R \qquad (22)$$

$$Q_{Wr}\vec{\Phi}_R + A_{ww}\Phi_W = b_w \qquad (23)$$

Solving for $\Phi_W$ from Eq 22 results in:

$$\Phi_W = A^{-1}_{ww}(b_w - A_{wR}\vec{\Phi}_R) \qquad (24)$$

Substituting into Equations (21)

$$A_{RR}\vec{\Phi}_R + A_{Rw}(A^{-1}_{ww}(b_w - A_{wR}\vec{\Phi}_R)) = \vec{b}_R \qquad (25)$$

Collecting the terms in Equation (25) produces:

$$(A_{RR} - A_{ww}^{-1}A_{wR}A_{RW})\vec{\Phi}_R = \vec{b}_R - A_{Rw}A_{ww}^{-1}b_w \qquad (26)$$

The coefficient matrix $(A_{RR}-A_{ww}^{-1}A_{wR}A_{RW})$ of Equation (26) is an (Nz×Nz) full matrix.

The resulting coefficient matrix can be defined as follows:

$$\tilde{A} = A_{RR} - A_{ww}^{-1}A_{wR}A_{RW}$$

and $$\tilde{b} = \vec{b}_R - A_{Rw}A_{ww}^{-1}b_w \qquad (27)$$

Then Equation (26) can be written as:

$$\tilde{A}\vec{\Phi}_R = \tilde{b}_R \qquad (28)$$

The matrix of Equation (28) can be solved by a direct solver by Gaussian elimination or any other suitable conventional solver for the full matrices.

If in the implicit well model the number of layers Nz is large, and wells are fully completed in all the layers, then the solution of Equation (28) becomes expensive in computation time. For this reason and also if many wells are involved, generally Equation (28) is solved by iterative methods. An example of this is described in "A Fully-Implicit Fully-Coupled Well Model for Parallel Mega-Cell Reservoir Simulation", SPE Technical Symposium of Saudi Arabia Section, 14-16 May 2005.

Figure 10:
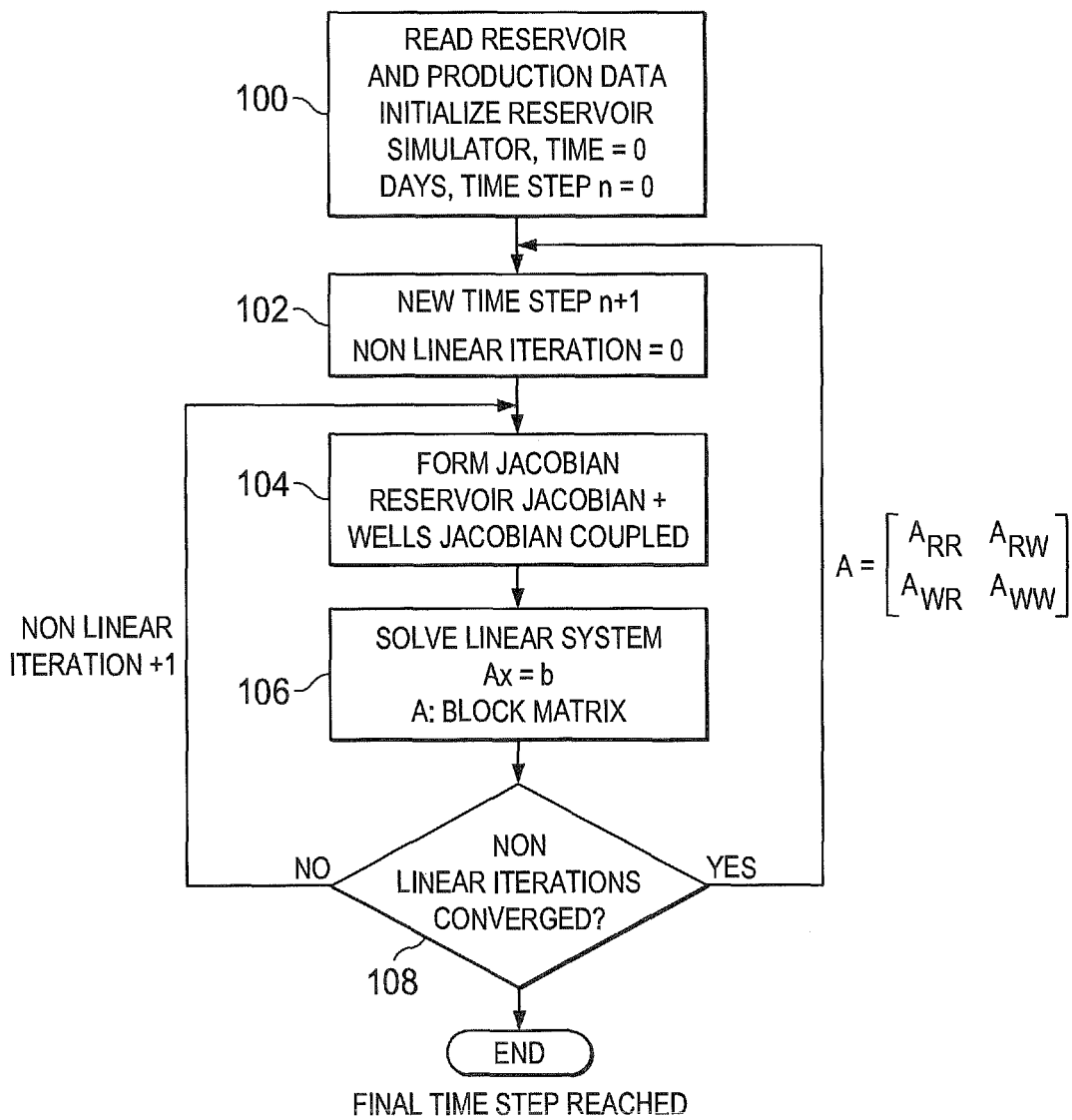
FIG. 10 is a functional block diagram or flow chart of data processing steps for a method and system for a fully implicit fully coupled well model with simultaneous numerical solution for reservoir simulation.

A flow chart I (FIG. 10) indicates the basic computer processing sequence of fully implicit, fully coupled well model simultaneous solution for the type of matrix illustrated in FIG. 13. During a step 100, simulation begins by reading the reservoir and production data. Reservoir data includes reservoir geometric information-its size, extent (length) in x, y, and z directions, reservoir properties such as permeability distribution, porosity distribution, thickness of layers, relative permeability data, capillary pressure data, fluid property data such as fluid density tables, formation volume factor tables, viscosity tables, location of wells, location of well perforations within the reservoir.

Production data includes oil, water, and gas production rate measured or specified for the wells defined in the previous step. Production data also includes minimum bottomhole pressure for each well.

In many instances, only oil production rates and water production rates are input if the gas production data is not available. If no water is produced in the field, only oil production rates are read as input.

During step 102 the time step is incremented by one, and an iteration counter of the number of non-linear iterations performed during the present time step is set to zero. During step 104, a Jacobian matrix of reservoir data is formed. In step 106, the resultant linear system of Equation (19) is then solved by iterative methods using sparse preconditioners (Yousef Saad, Iterative Methods for Sparse Linear Systems, Society of Industrial & Applied Mathematics (SIAM) Publication, 2003).

During step 108, a convergence step is performed to determine whether the non-linear iterations have converged. The individual residuals of the equations resulting from step 106 are checked against user-specified tolerances. If these tolerances are satisfied, the non-linear iteration loop is exited, the solution output is written to file for the current time step and processing returns to step 102 for the time step to be advanced, and processing for the incremented time step then proceeds as indicated. If the user-specified tolerances are determined not satisfied during step 108, processing according to the non-linear iteration loop returns to step 104 and continues. If the number on non-linear iterations becomes too large, a decision may be made to reduce the time step size and go back to step 102.

However, based on the strength of the preconditioning, this method can also be very expensive in computation time, since there is no exact way of representing the full matrix in Equation (19). For difficult problems, with extreme heterogeneity and small layer thicknesses, the iterative method may not converge.

Additionally, for highly heterogeneous reservoirs with some vertically non-communicating layers, the above described well models do not produce the correct physical solution. Instead, they can produce incorrect flow profiles, and in some occasions they can cause simulator convergence problems.

The Present Invention

Figure 5:
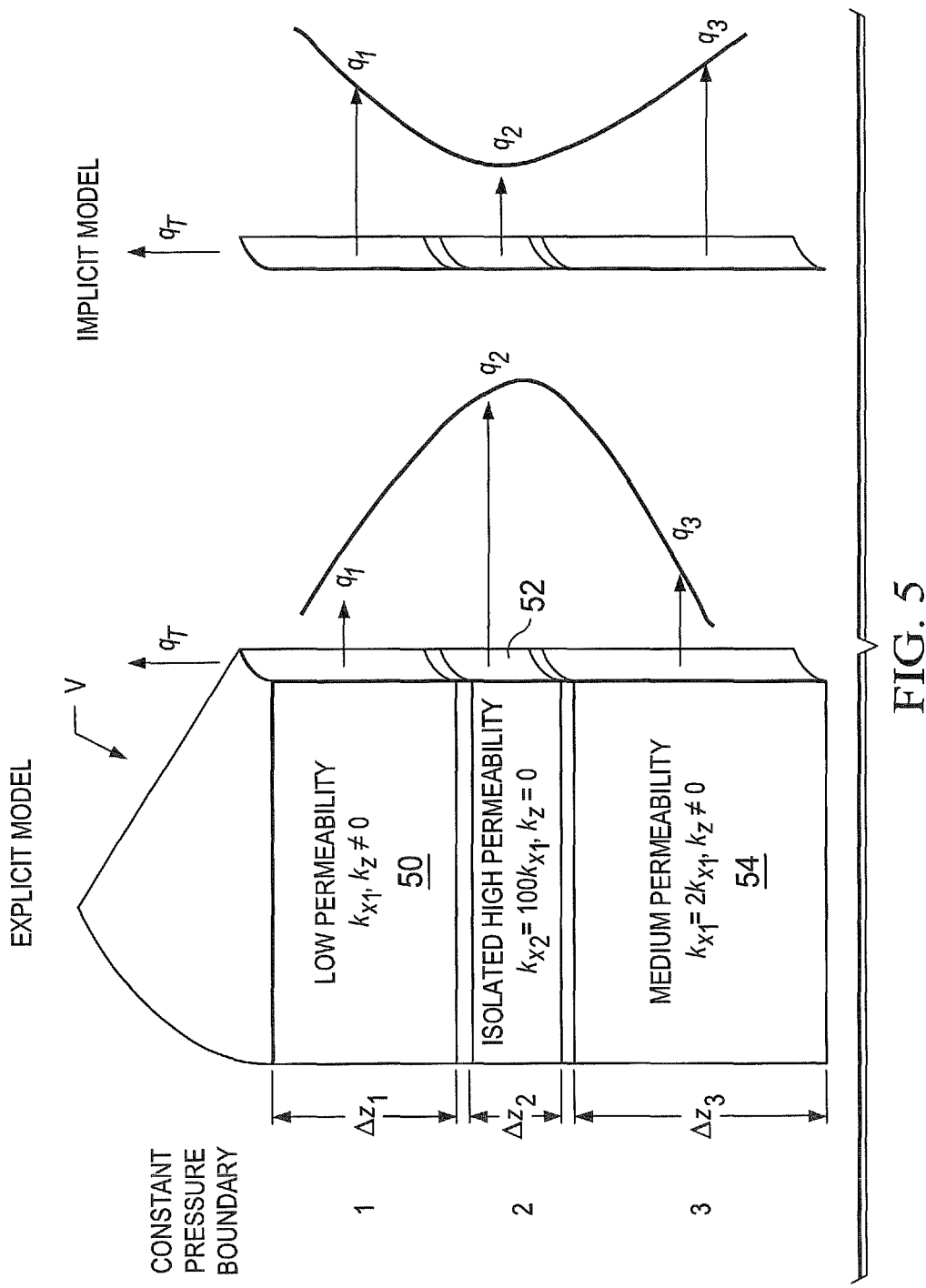
FIG. 5 is a schematic diagram of a well model for reservoir simulation with a comparison of flow profiles obtained from the models of FIGS. 3 and 4.

Explicit and fully implicit models can produce totally different flow profiles in case of some vertical flow barriers. This is displayed in FIG. 5. As shown in FIG. 5, a reservoir model V is composed of an upper layer 50 of relatively low permeability, and with vertical flow, located above an isolated high permeability layer 52 with no vertical flow communication with adjacent layers. The flow barrier layer 52 is located in the reservoir V above a layer 54 of medium permeability and having vertical flow communication. As can be seen in FIG. 5, the production rates qT for the well model V are the same for both implicit and explicit well modeling methods.

However, the production rates q1, q2, and q3 of layers 50, 52 and 54 differ significantly. The production rate q2 for the layer 52 is the major contribution to the total production rate qT as shown by curve 56 for the explicit model. On the contrary, for the implicit model as shown by curve 58, production rate q2 for the layer 52 is markedly less.

In the fully implicit well model, the production rate for the layer 2 is significantly less due to the fact that this method takes into account internal reservoir heterogeneity (all the reservoir properties throughout the reservoir) and heterogeneity around the well blocks in addition to the perforation index (or layer 2 property alone as is used by the explicit method as the only data to assign the rate fraction to this perforation). For example, the fully implicit well method sees that there is no fluid supplied into layer 2 from layer 1 and layer 3 due to the impermeable barrier between layer 2 and layer 1 and 3. Therefore, once some fluid is produced from well model layer 2, the pressure of layer 2 should go down and this layer should not supply at a high rate into the well, although the layer has very high permeability.

On the other hand, the explicit method assigns the rate for layer 2 based on the permeability of this layer alone without considering the layer connection to the above and below layers. Based on this, the explicit method will assign a very high rate for this layer and will keep it for the next simulation time step. In later simulation time steps, this will cause instability in the production rates, i.e., the simulator will reduce the time step size and will take a very long time to complete the simulation. It is unsatisfactory for reservoir simulation to have models provide divergent results for the same input data based on the modeling technique selected for use.

Figure 4:
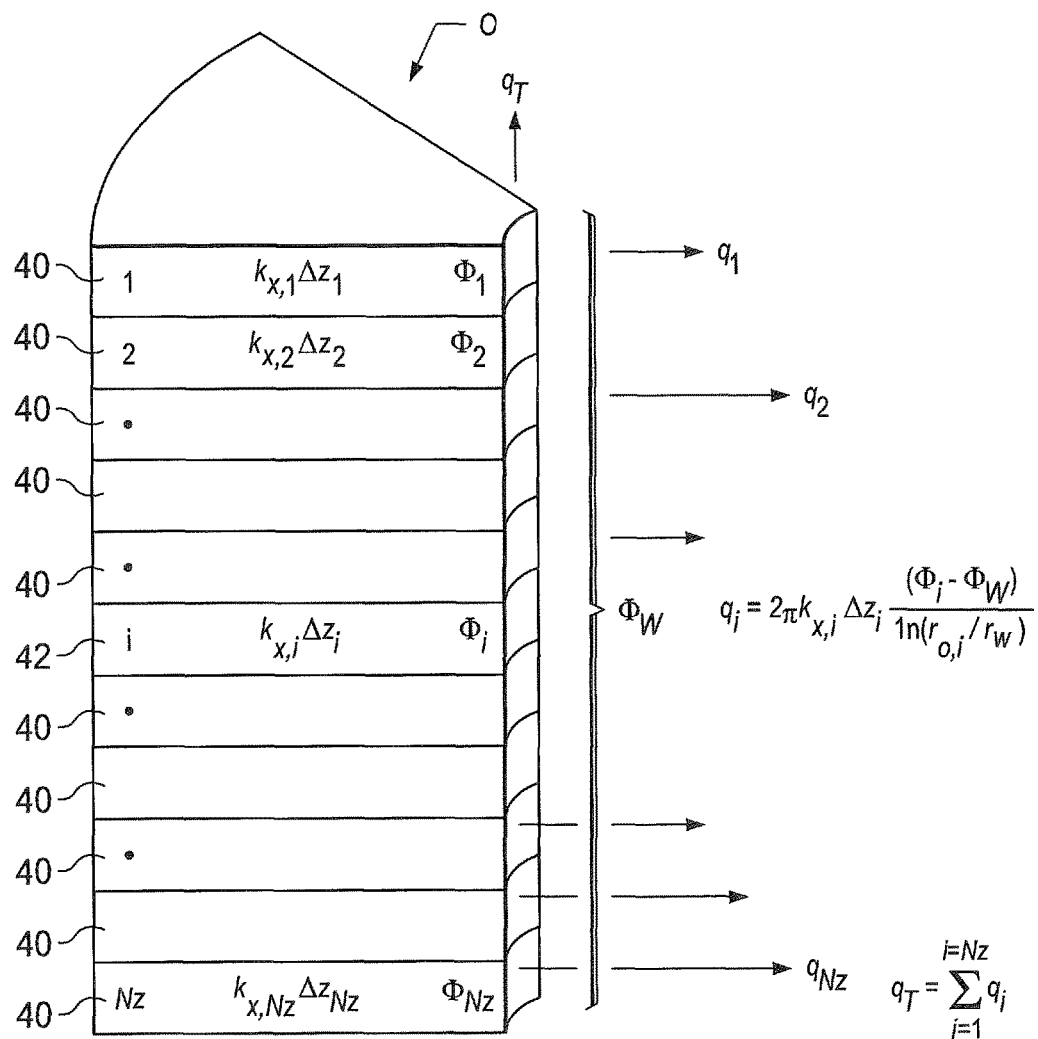
FIG. 4 is a schematic diagram of a well model for simulation based on a fully implicit, fully coupled model methodology.

According to the present invention, a more comprehensive well model is provided. The well model according to the present invention is called a coupled reservoir well model. The associated numerical solution is referred to fully implicit, fully coupled and simultaneous solution. A fully implicit fully coupled reservoir well model produces correct flow profile along the perforated well interval, as will be described. As shown in FIG. 4 a reservoir model O is composed of a number z of i individual layers 1 through Nz, each with a permeability $k_{x,i}$ and a thickness $\Delta z_i$ and a potential $\Phi_i$ defined as indicated in FIG. 4, and upper and lower layers 40 of relatively low permeability, and with vertical flow, located above and below, respectively, an isolated high permeability layer 42 with no vertical flow communication with adjacent layers. As can be seen in FIG. 4, the production rates $q_i$ for layer i of the model O is an indicated by the expression set forth in FIG. 4.

The fully implicit coupled reservoir well model V of FIG. 5 is presented in Equation (20) above and is also presented here in matrix format for further description:

$$\begin{bmatrix} A_{RR} & A_{RW} \\ A_{WR} & A_{WW} \end{bmatrix} \begin{bmatrix} \vec{p}_R \\ \vec{p}_w \end{bmatrix} = \begin{bmatrix} \vec{b}_R \\ \vec{b}_w \end{bmatrix} \quad (21)$$

The present invention is based on the fact that the bottom hole pressure of a layered reservoir with a vertical well is the same as a system according to the present invention. The system according to the present invention is formed by identifying flow barriers and lumping together or combining for processing purposes the reservoir layers around the well which are communicating in the vertical direction. Care should be taken according to the present invention in the formation of the reduced system. The reduced system must be formed correctly, or otherwise errors in the reduced system construction can increase the total number of non-linear Newton iterations.

The system according to the present invention is solved for the bottom hole pressure. The solution is carried out by treating the well as specified bottom hole pressure well. The procedure is fully implicit; however, it is not a simultaneous solution. Instead, the solution is sequential. The method of the present invention is convergent since it is part of the global Newton iteration of the simulator. Therefore, if the model according to the present invention is constructed correctly, any possible error in rate calculations will be small and will diminish with the simulator Newtonian iterations.

A flow chart F (FIG. 11) illustrates the basic computer processing sequence according to the present invention and the computational methodology taking place during a typical embodiment of a sequential fully implicit well model for reservoir simulation with the present invention.

During a step 200, simulation begins by reading the reservoir and production data. Reservoir and production data read in during step 200 are of the types discussed above. The reservoir simulator is also initialized during step 200, setting the simulation day and the time step to zero. During step 202 the time step is incremented by one, and an iteration counter of the number of non-linear iterations performed during the present time step is set to zero.

During step 204, a Jacobian matrix of reservoir data is formed. In step 206, a reduced system like that defined by the model R described above is formed according to the present invention and the matrix solved for bottom hole potential $\Phi_w$ in the manner described above. During step 208, the modified linear system matrix A is solved according to the present invention in the manner set forth above.

Figure 11:
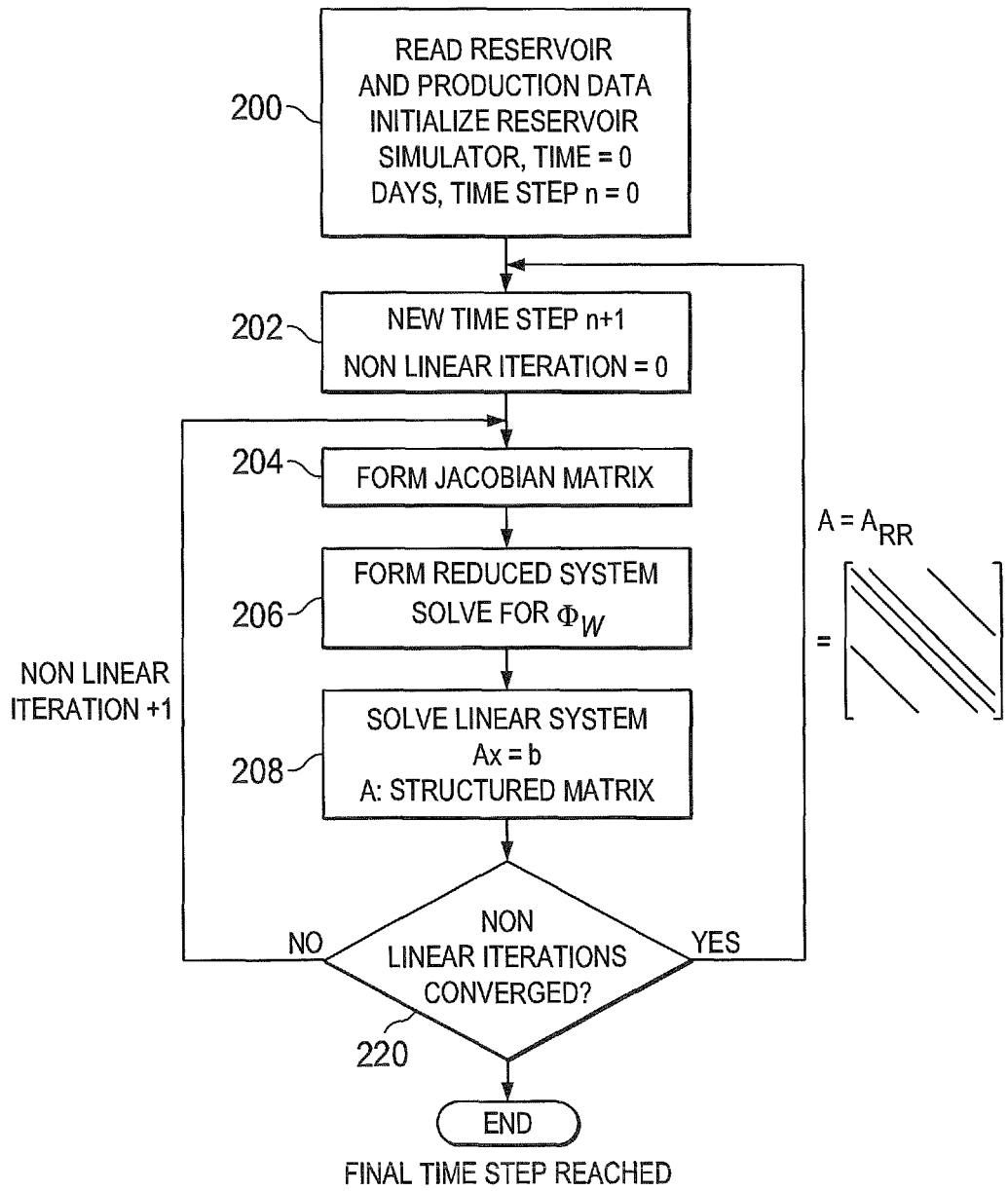
FIG. 11 is a functional block diagram or flow chart of data processing steps for a method and system for a sequential fully implicit well model for reservoir simulation according to the present invention.
Figure 15:
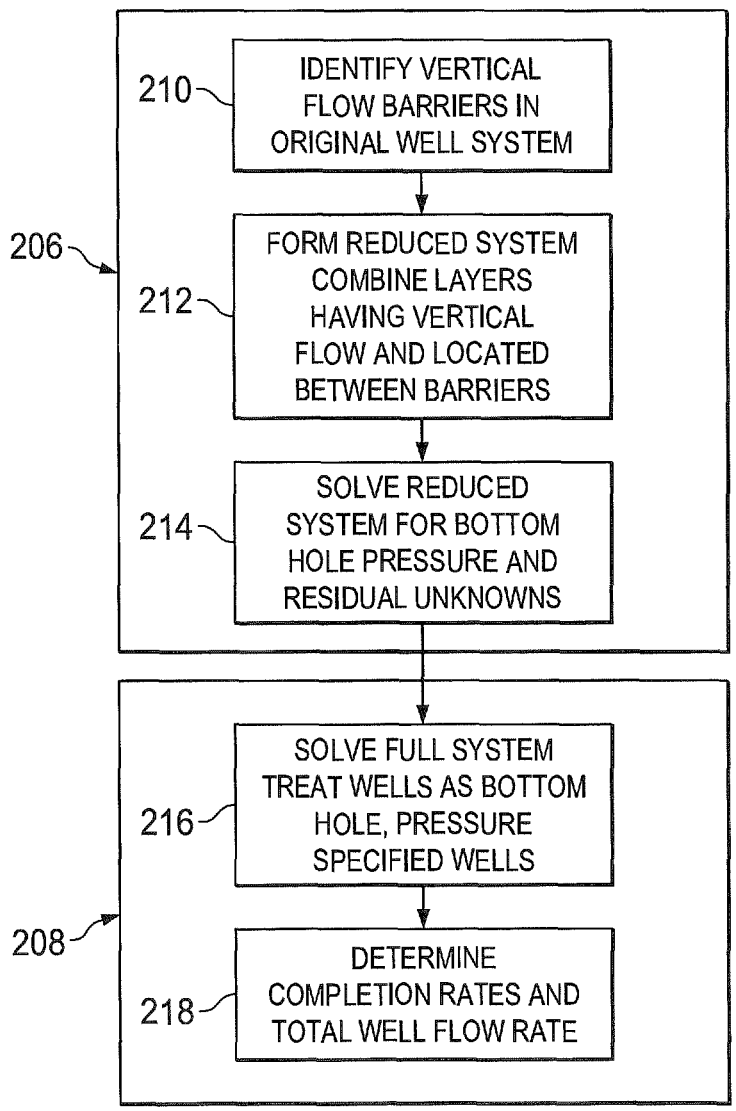
FIG. 15 is a functional block diagram or flow chart of steps illustrating the analytical methodology for reservoir simulation according to the present invention.

FIG. 15 illustrates the methodology of forming the reduced well model system matrix R and solving for bottom hole potential $\Phi_w$ according to steps 204 and 206 of FIG. 11. As indicated at step 210, vertical flow barriers in the original well model system are identified. This can be done based on well log data or by specification by a reservoir analyst from data in the original reservoir model.

After steps 210, a reduced well model system model is then formed by the data processing system D during a step 212. Those layers in the well model which are located between flow barrier layers and have vertical flow are combined together for analytical model purposes.

Next, during step 214, the resulting reduced well model system is solved by computer processing for bottom hole potential $\Phi_w$ and reservoir unknowns using the techniques discussed of Equations (17), (17a) and (17b). Step 216 then solves with the data processing system D the full well model system structural matrix of Equation (27) using a direct solver or other suitable technique described above. Completion rates $q_i$ and total well flow rate $q_T$ are then determined with the data processing system D based on the results of step 216.

Referring again to FIG. 11, during step 220, a convergence step is performed to determine whether the non-linear iterations have converged. The individual residuals of the equations resulting from step 216 are checked against user-specified tolerances. If these tolerances are satisfied, the non-linear iteration loop is exited, the solution output is written to file for the current time step and processing returns to step 202 for the time step to be advanced, and processing for the incremented time step the proceeds as indicated. If the user-specified tolerances are determined not satisfied during step 208, processing according to the non-linear iteration loop returns to step 204 and continues. If the number on non-linear iterations becomes too large, a decision may be made to adjust the model.

Horizontal Wells

Figure 19:
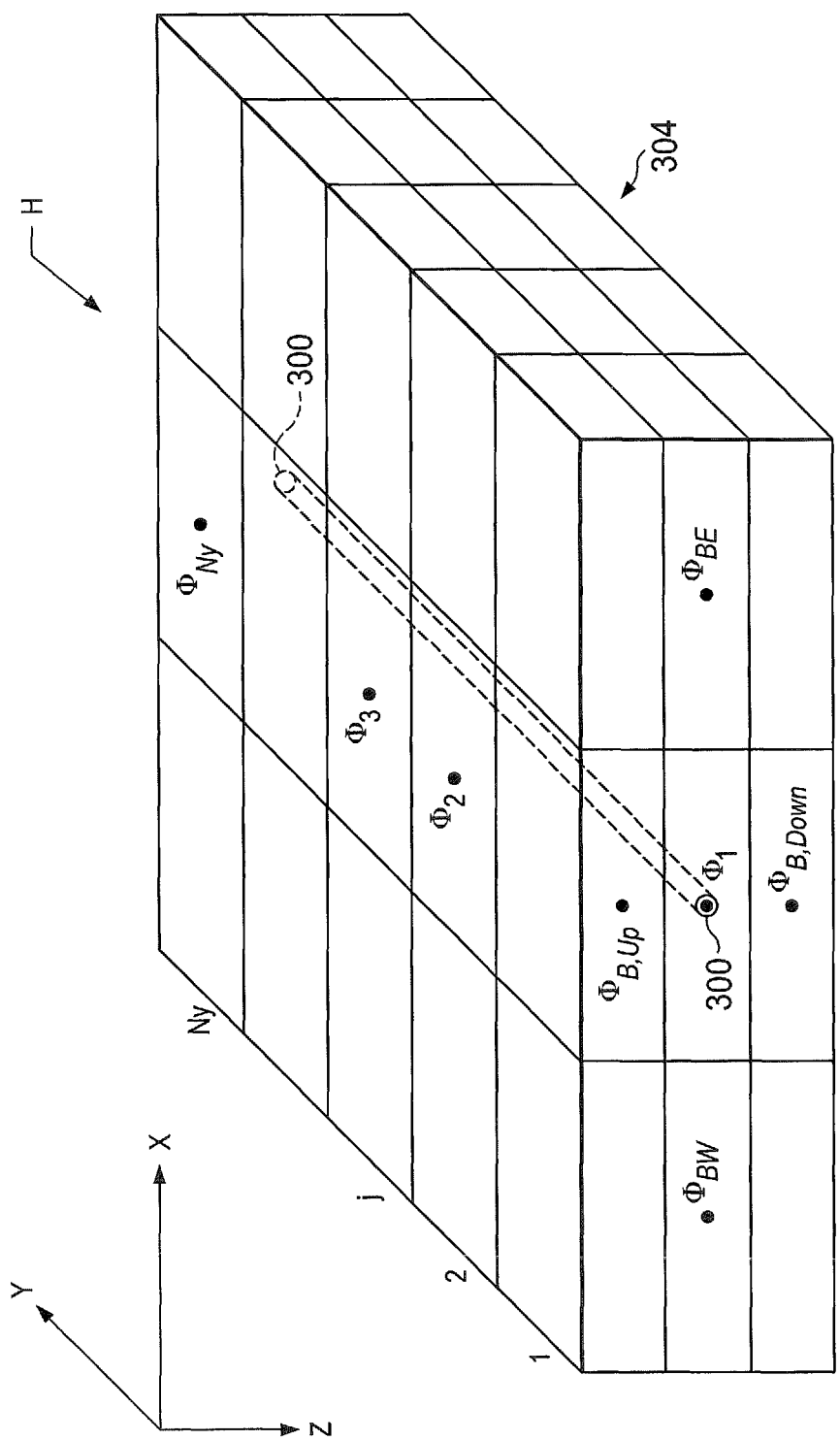
FIG. 19 is a schematic diagram of a finite difference grid system for a horizontal well model oriented in a y-axis direction according to the present invention.
Figure 24A:
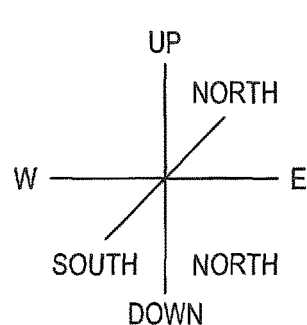
FIGS. 24A and 24B are schematic diagrams illustrating notations for grid nomenclature in the multiple well reservoir model of FIGS. 19 and 23.
Figure 24B:
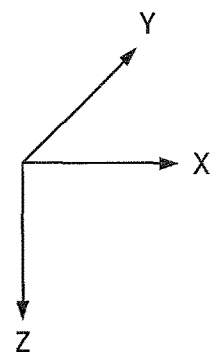
Figure 25A:
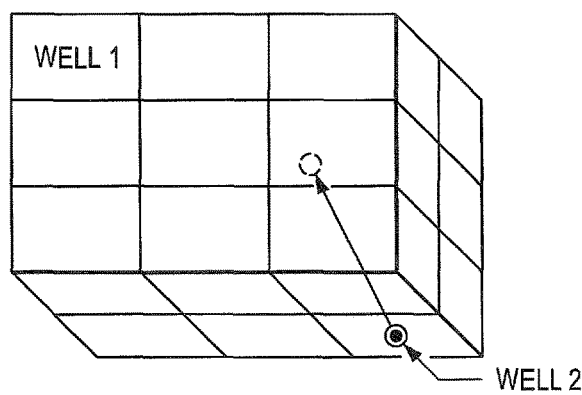
FIGS. 25A, 25B, 25C and 25D are schematic diagrams illustrating grid numbering for a three-dimensional reservoir model.
Figure 25B:
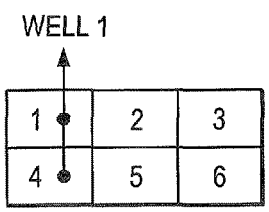
Figure 25C:
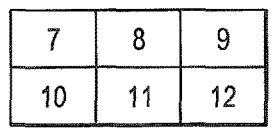
Figure 25D:
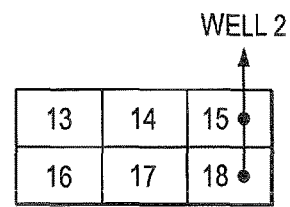

FIG. 19 displays a horizontal well 300 oriented in y direction located in a three dimensional reservoir model H. The model H of FIG. 19 is like FIG. 6, a finite difference grid, but of horizontal well 300. The well 300 is located in the center of a central cell in each of a succession of subsurface formation segments 304 in the y-direction extending in vertical plans or in the z-direction. FIGS. 24A and 24B illustrate notations for grid cells in the horizontal wall model H of FIG. 19. As seen in FIG. 19, the well 300 is completed in the horizontal or y-direction through $N_y$ cells, and the potentials in the adjacent cells:

$$\Phi_{B_{Up}}, \Phi_{B_E}, \Phi_{D_{own}}, \Phi_{B_W}$$

are constants and known from the simulation run (previous time step or iteration value). The subscript B refers to boundary, Up indicates above neighbor, E indicates east neighbor, down indicates below neighbor, and W indicates west neighbor, with $\Phi$ again describing the fluid potential or datum corrected pressure. In FIG. 19, the well 300 extends horizontally along a longitudinal axis through each of a succession of grid blocks 302 in the y direction. If a known total well rate, $q_T$, is input into a reservoir simulator, the reservoir simulator calculates for each time step the potential values $\Phi$ for each grid block 302 shown in FIG. 19.

As will be set forth, the present invention improves computer performance as a reservoir simulator in forming measures of perforation rate qi for the layers which adds up to known total rate $q_T$.

Similar to Equation (16), perforation rate $q_i$ for each grid block can be expressed as:

$$q_i = PI_i(\Phi_i - \Phi_w) \quad (29)$$

In Equation (29), the productivity index is governed by $$PI_i = \frac{2\pi k_{zy} \Delta y}{\ln(r_{o,i}/r_w)} \quad (30)$$

$$q_T = \sum_{i=1}^{N_y} q_i$$

$$k_{zy} = \sqrt{k_z k_y}$$

$$r_{o,i} = 0.28 \frac{\left\{\left(\frac{k_y}{k_z}\right)^{1/2} \Delta z^2 + \left(\frac{k_z}{k_y}\right)^{1/2} \Delta y^2\right\}^{1/2}}{\left(\frac{k_y}{k_z}\right)^{1/4} + \left(\frac{k_z}{k_y}\right)^{1/4}} \quad (31)$$

The above expression of reservoir parameters and their physical relationships is according to Chen and Zhang, "Well Flow Models for Various Numerical Methods". International Journal of Numerical Analysis and Modeling, Vol 6, No 3, pages 378-388.

Figure 21:
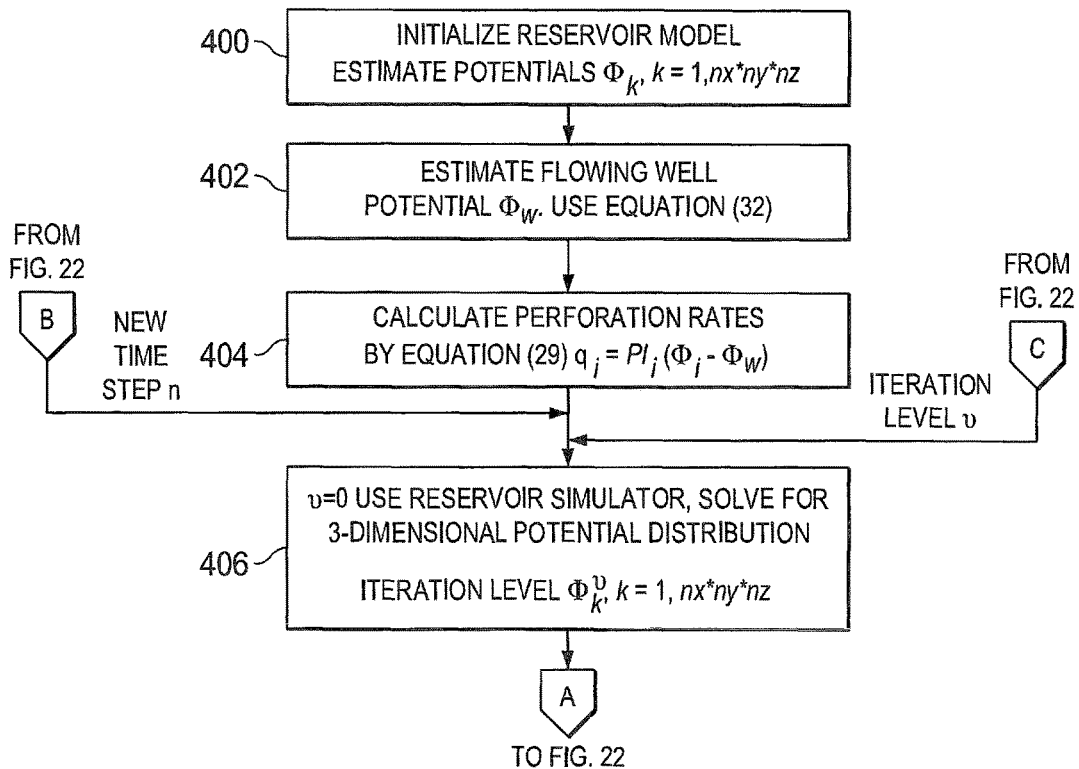
FIGS. 21 and 22 are functional block diagrams or flow charts of data processing steps for a method and system for a reduced horizontal well model according to the present invention.
Figure 22:
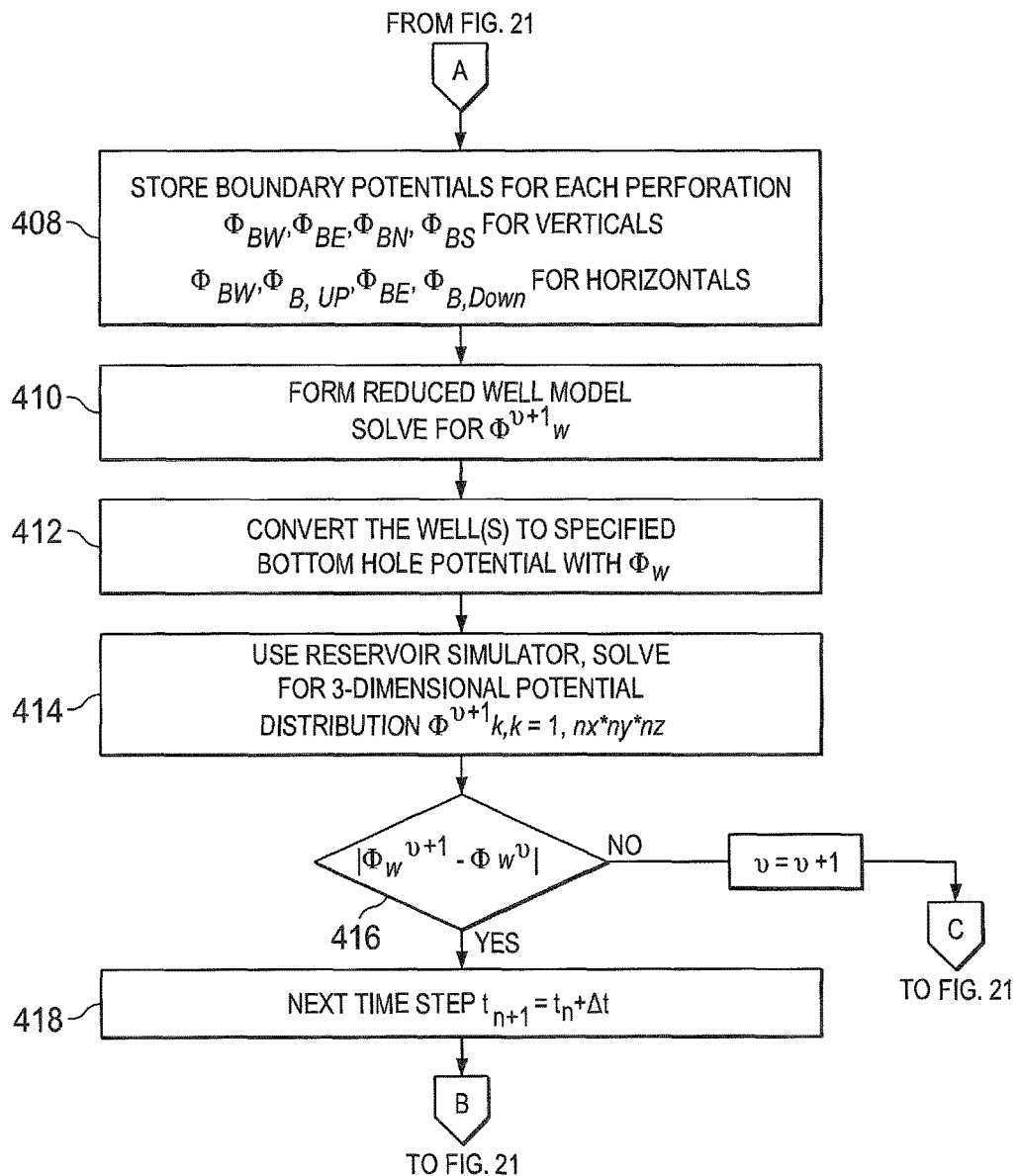

FIGS. 21 and 22 collectively represent a flow chart G which illustrates the basic computer processing sequence according to the present invention and the computational methodology taking place during a typical embodiment of a sequential fully implicit well model for horizontal well models, such as shown in FIG. 19 for reservoir simulation with the present invention. During a step 400, simulation begins by initializing the reservoir model H in the data processing system D and reading the reservoir and production data. The reservoir and production data read in during step 400 are of the types discussed above for vertical well models in connection with the flow chart F and step 200 (FIG. 11).

During step 400 an estimate of cell potentials $\Phi_k$ is formed for the k cells of the horizontal well model H. As indicated schematically in FIG. 19, k=nx*ny*nz. During step 402, an estimate of well bore potential is formed according to Equation (32) as set forth below:

$$\Phi_w = \frac{\sum PI_i \Phi_i}{\sum PI_i} - \frac{q_i}{\sum PI_i} \quad (32)$$

where $\Phi_i$ in Equation (32) is calculated from the initial potential distribution determined in step 400.

During step 404, perforation rates qi are determined for each cell I according to the relationship expressed in Equation (29) above. In step 406, the reservoir simulator is initialized and the simulator iteration counter $\upsilon$ set to zero. The simulation time step t is also initialized to zero for an initial iteration. The iteration counter and the time step counter are thereafter incremented, as will be set forth below, before performing step 406 during subsequent iterations. The grid block potential for the initial time step is determined during step 406 by solving a three dimensional potential equation with the reservoir simulator according to Equation (1) for a single phase oil flow. During step 408 boundary potentials are determined around each perforation $\Phi_{BW}, \Phi_{B,Up}, \Phi_{BE}, \Phi_{B,Down}$ for each perforation (i), for i=1, 2, Ny and stored in memory of the data processing system D.

Figures 20A, 20B:
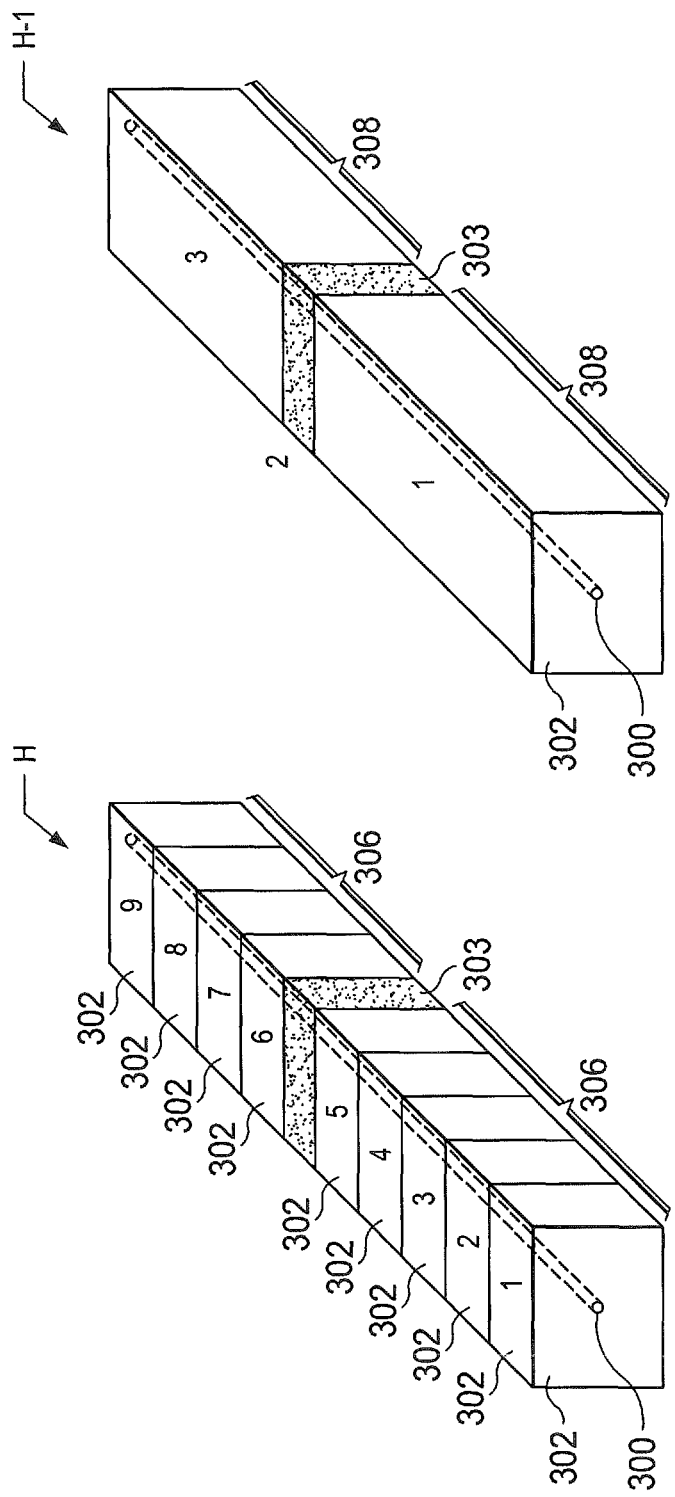
FIGS. 20A and 20B are schematic diagrams of horizontal well models in a reservoir simulator of multiple subsurface formation layers in the area of a flow barrier in a reservoir, before and after being formed into a reduced horizontal well model according to the present invention.

Step 410 is then performed to form a reduced well model H-1 (FIG. 20B) by lumping the grid blocks 302 with no flow barriers among them as shown at 306 in FIG. 20A. For performing step 410, horizontal flow barriers such as shown at 303 in the original horizontal well model system H are identified. This can be done based on well log data or by specification by a reservoir analyst from data in the original reservoir model. The reduced well model system model forming during step 410 results in those layers 302 in the well model H which are located between flow barrier grid blocks or layers 303 and have horizontal flow between them being combined together for analytical model purposes.

As can be seen in the example of FIGS. 20A and 20B, the horizontal well model H of FIG. 20A with two groups of four grid blocks 302 on opposite sides of a flow barrier grid block 303 is transformed to reduced well model H-1 as a result of step 410, the reduced well model H-1 having two grid blocks 308, one on each side of flow barrier block 303.

The reduced well model equations for the reduced well model system H-1 in FIG. 20B thus as shown in FIG. 20C becomes:

$$\begin{Bmatrix} T_{c1} & T_{E1} & 0 & PI_1 \\ T_{w2} & T_{C2} & T_{E2} & PI_2 \\ 0 & T_{w3} & T_{C3} & PI_3 \\ PI_1 & PI_2 & PI_3 & -PI_T \end{Bmatrix} \begin{Bmatrix} \tilde{\Phi}_1 \\ \tilde{\Phi}_2 \\ \tilde{\Phi}_3 \\ \tilde{\Phi}_W \end{Bmatrix} = \begin{Bmatrix} 0 \\ 0 \\ 0 \\ q_t \end{Bmatrix} \qquad (18)$$

where $PI_T = \Sigma_{i=1}^{3} PI_i$.

Then, during step 410 (FIG. 22) the reduced well model is solved for $\tilde{\Phi}_1$, $\tilde{\Phi}_2$, $\tilde{\Phi}_3$, and $\tilde{\Phi}_w$, where $\tilde{\Phi}$ represents the grid block potential of the reduced horizontal well model H-1.

During step 412, the horizontal well model is converted to a fixed flowing bottom hole potential well using $\tilde{\Phi}_w$. Step 414 involves solving the three diagonal matrix system of FIG. 20C for the reduced horizontal well model H-1 shown in FIG. 20B to determine the potentials for each grid 302 shown in FIG. 19.

Referring again to FIG. 22, during step 416, a convergence step is performed to determine whether the non-linear iterations have converged. The individual residuals of the equations resulting from step 414 are checked against user-specified tolerances. If these tolerances are satisfied, the non-linear iteration loop is exited, the solution output is written to file and stored in memory of the data processing system D for the current time step and processing returns to step 418 for the time step t to be advanced, and processing for the incremented time step the proceeds to step 406 as indicated. If the user-specified tolerances are determined not satisfied during step 416, processing according to the non-linear iteration loop returns to step 406 and continues. If the number on non-linear iterations becomes too large, a decision may be made to adjust the model.

Multiple Vertical Wells

Figure 23:
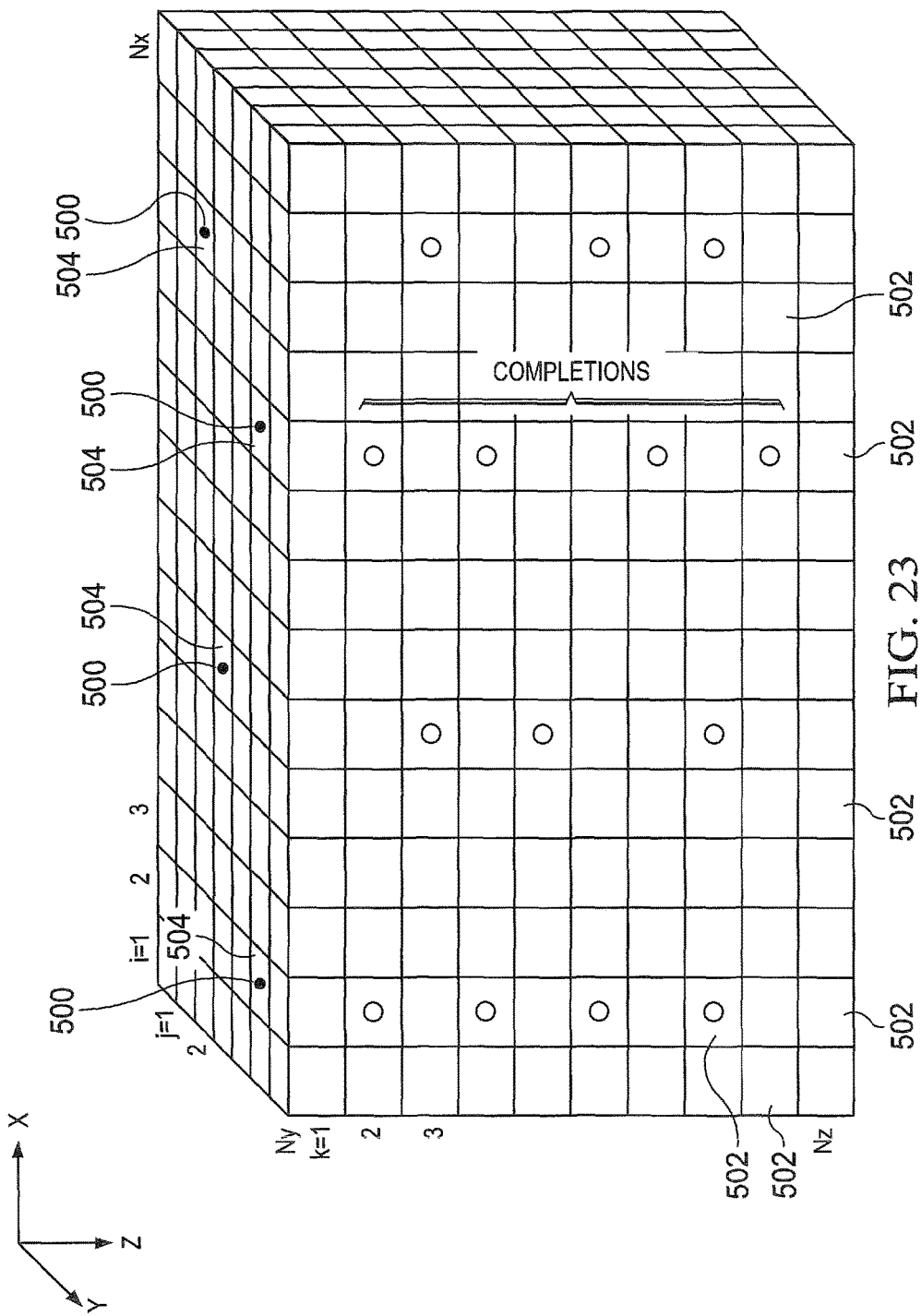
FIG. 23 is a schematic diagram of a finite difference grid system for a reservoir model with multiple wells according to the present invention.

A 3 dimensional reservoir model M is shown in FIG. 23 with multiple vertical wells 500, each with assumed single phase, slightly compressible oil flow. The model M is organized according to the nomenclature in the notations schematically illustrated in FIGS. 25A, 25B, 25C and 25D.

The model M of FIG. 23 is, like FIG. 6 and, a finite difference grid, but of a number of vertical wells 500. The wells 500 are each located in the center of a central cell in each of a succession of subsurface formation segments 504 in the z-direction extending in horizontally or in the y- and z-directions.

As in FIG. 6, each well 500 is completed in the vertical or z-direction through Nz cells, and the potentials in the adjacent cells:

$$\Phi_{B_N}, \Phi_{B_E}, \Phi_{B_S}, \Phi_W$$

are constants and known from the simulation run (previous time step or iteration value). As in FIG. 6, the subscript B refers to boundary, N indicates above neighbor, E indicates east neighbor, down indicates below neighbor, and W indicates west neighbor, with $\Phi$ again describing the fluid potential or datum corrected pressure.

Each well 500 extends vertically along a longitudinal axis through each of a succession of grid blocks 502 in the z direction, and at certain formation layers at various depths each well 500 is intersected by completions 506. FIGS. 25A through 25D illustrate schematically the numbering notations in the model M for wells 50 designated Well 1 and Well 2 in FIG. 23.

If a known total well rate, qT, for each well 500 is provided as an input parameter into a reservoir simulator, the reservoir simulator calculates for each time step the potential values $\Phi$ for each grid block 502 shown in FIG. 23.

For a generalized case of 3-dimensional vertical reservoir model M, the number of the wells is represented by n, and the total well rates for each well 500 are given and denoted by $q_T(l)$, l=1, $n_w$ are known from production data and provided as input parameters into the reservoir simulator.

Figure 26:
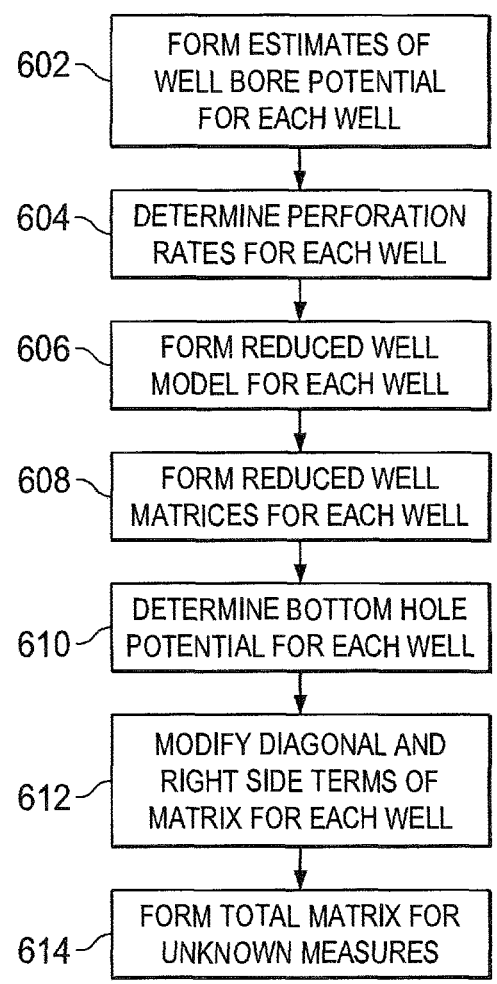
FIG. 26 is a functional block diagram or flow chart of data processing steps for a method and system for a modification of the block diagram of FIG. 11 for multiple wells in a reservoir with a fully implicit fully coupled well model with simultaneous numerical solution for reservoir simulation.

FIG. 26 represent a flow chart for processing according to the present invention where multiple vertical wells are present, as is the case in the model M of FIG. 23. Thus for the 3-dimensional vertical reservoir model M, in step 602, the reservoir simulator is initialized and reservoir and production are read from memory for processing. This is done in a comparable manner to step 200 if FIG. 11. Simulation processing continues in 602 shown in FIG. 26, where an estimate of the well bore potential $\Phi w$ (l) l=1, 2, . . . nw is formed for each well according to Equation (32), with the productivity index PI being determined according to the measures expressed in Equation (17). During step 604, the perforation rates $q_j$ (l), l=1, . . . nw are computed for each well, based on the estimates of well bore potentials resulting from step 602.

Step 606 involves forming of reduced well models for each well l=1, 2, . . . nw for the 3-dimensional multiple well model M. The reservoir simulation is performed by combining or merging adjacent well cells 502 of the formation layers which have fluid communication between each other and are also located between flow barrier layers which have no flow through them. This is done in a manner for layers of a 3-dimensional in a manner such as that shown schematically in FIGS. 1A and 1 for layers adjacent a single vertical low well, and in FIGS. 20A and 20B for layers adjacent horizontal flow wells.

In step 608, reduced well matrices are formed for each well based on the reduced well models form step 606, in a comparable manner to the reduced well matrix of FIG. 20C for the horizontal well model H of FIG. 19.

Figure 27:
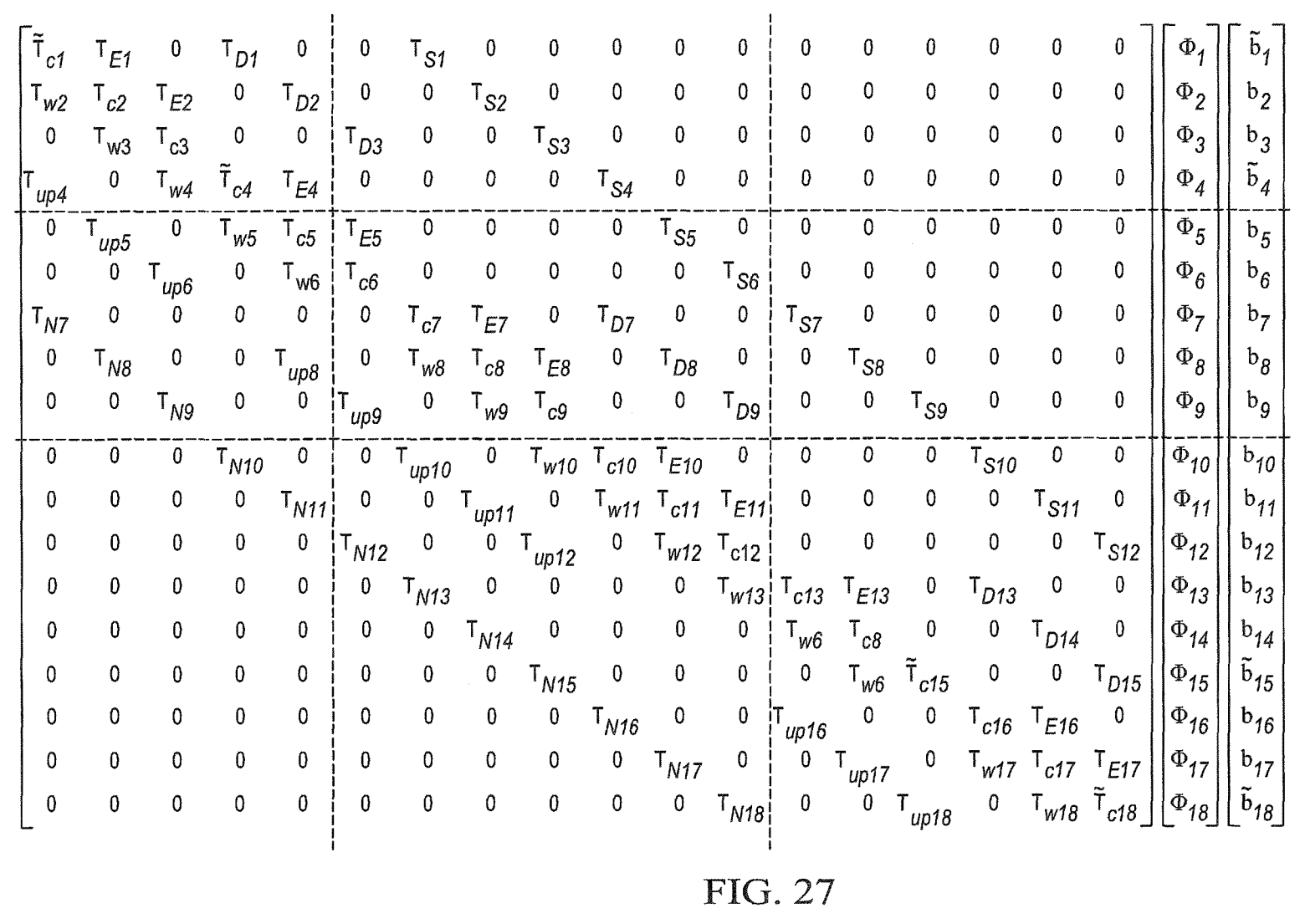

Then, in step 610, bottom hole potential $\Phi w$ (l), l=1, 2, . . . nw is determined for each well by solving the reduced well matrices resulting from step 608. In step 612, the diagonal $\tilde{T}_{c,i}$ and right hand side $b_i$ term of the main matrix for each well is modified according to the relationships according to Equations 18, 18A and 18B above. FIG. 27 is an example schematic diagram of a reduced well matrix of a linear system of equations for a simplified two well, three-dimensional reservoir model, or 3×3×2 reservoir model using the numbering system explained in FIGS. 24A and 24B and FIGS. 25A through 25D.

During step 614, a total matrix, such as the example of FIG. 27, is formed for all the grid blocks 502 for the unknowns of the model M. Processing then after step 614 of FIG. 26 proceeds to convergence testing in the manner of step 416 of FIG. 27 and iteration and time step incrementing with return to step 602 for further processing iterations for the total system including each of the n, wells.

Data Processing System

As illustrated in FIG. 16, a data processing system D according to the present invention includes a computer 240 having a processor 242 and memory 244 coupled to the processor 242 to store operating instructions, control information and database records therein. The computer 240 may, if desired, be a portable digital processor, such as a personal computer in the form of a laptop computer, notebook computer or other suitable programmed or programmable digital data processing apparatus, such as a desktop computer. It should also be understood that the computer 240 may be a multi-core processor with nodes such as those from Intel Corporation or Advanced Micro Devices (AMD), or a mainframe computer of any conventional type of suitable processing capacity such as those available from International Business Machines (IBM) of Armonk, N.Y. or other source.

The computer 240 has a user interface 246 and an output display 248 for displaying output data or records of processing of well logging data measurements performed according to the present invention to obtain measurements and form models of determined well production of formation layers in a well or wells of subsurface formations. The output display 48 includes components such as a printer and an output display screen capable of providing printed output information or visible displays in the form of graphs, data sheets, graphical images, data plots and the like as output records or images.

The user interface 246 of computer 240 also includes a suitable user input device or input/output control unit 250 to provide a user access to control or access information and database records and operate the computer 240. Data processing system D further includes a database 252 stored in computer memory, which may be internal memory 244, or an external, networked, or non-networked memory as indicated at 254 in an associated database server 256.

The data processing system D includes program code 260 stored in non-transitory memories 244 of the computer 240. The program code 260, according to the present invention is in the form of computer operable instructions causing the data processor 242 to form a sequential fully implicit well model for reservoir simulation according to the present invention in the manner that has been set forth.

It should be noted that program code 260 may be in the form of microcode, programs, routines, or symbolic computer operable languages that provide a specific set of ordered operations that control the functioning of the data processing system D and direct its operation. The instructions of program code 260 may be stored in memory 244 of the computer 240, or on computer diskette, magnetic tape, conventional hard disk drive, electronic read-only memory, optical storage device, or other appropriate data storage device having a computer usable non-transitory medium stored thereon. Program code 260 may also be contained on a data storage device such as server 64 as a non-transitory computer readable medium, as shown.

Figure 7:
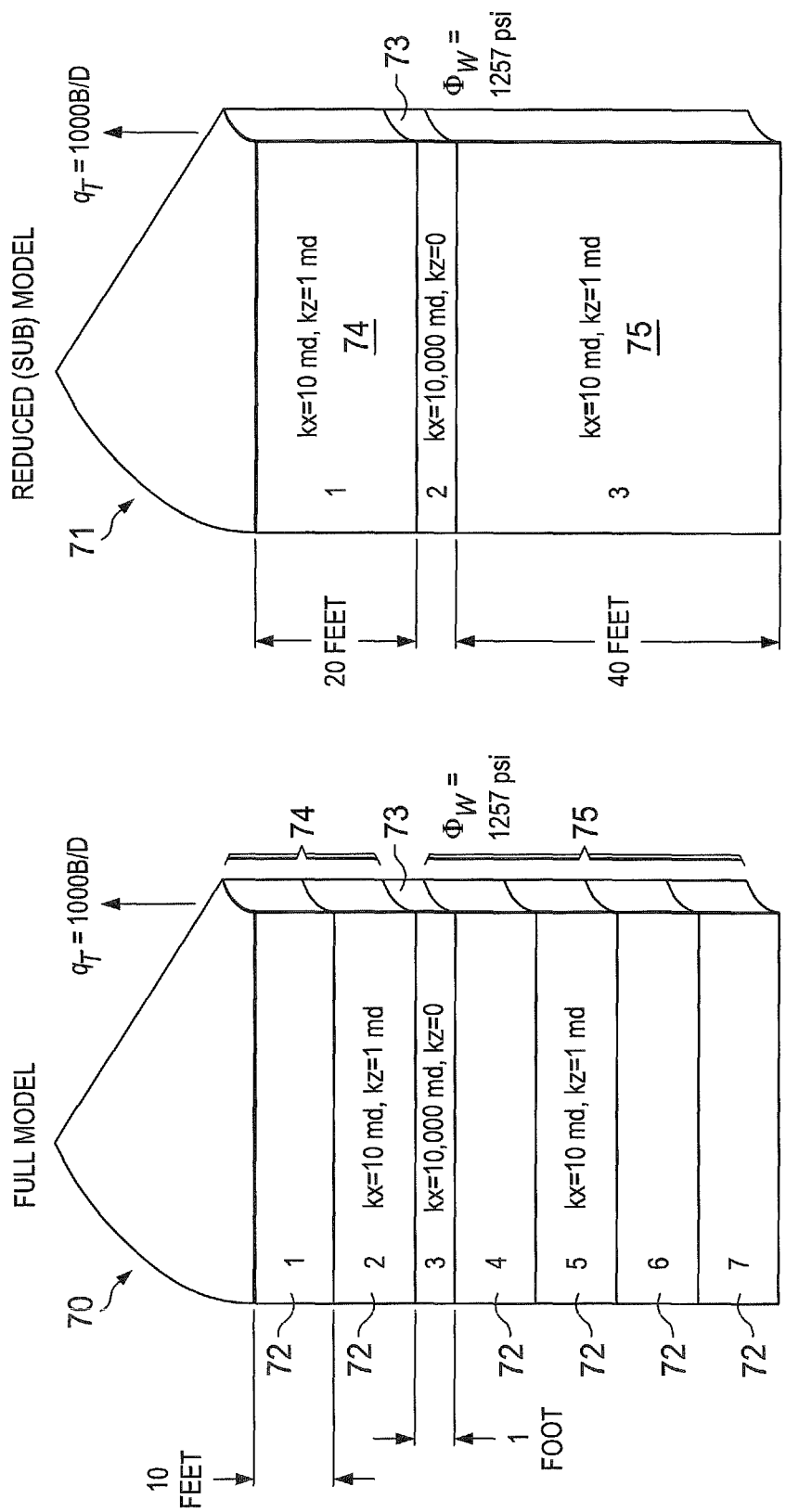
FIGS. 7A and 7B are schematic diagrams illustrating the well model reservoir layers for an unmodified conventional well layer model and a well layer model according to the present invention, respectively.
Figure 9:
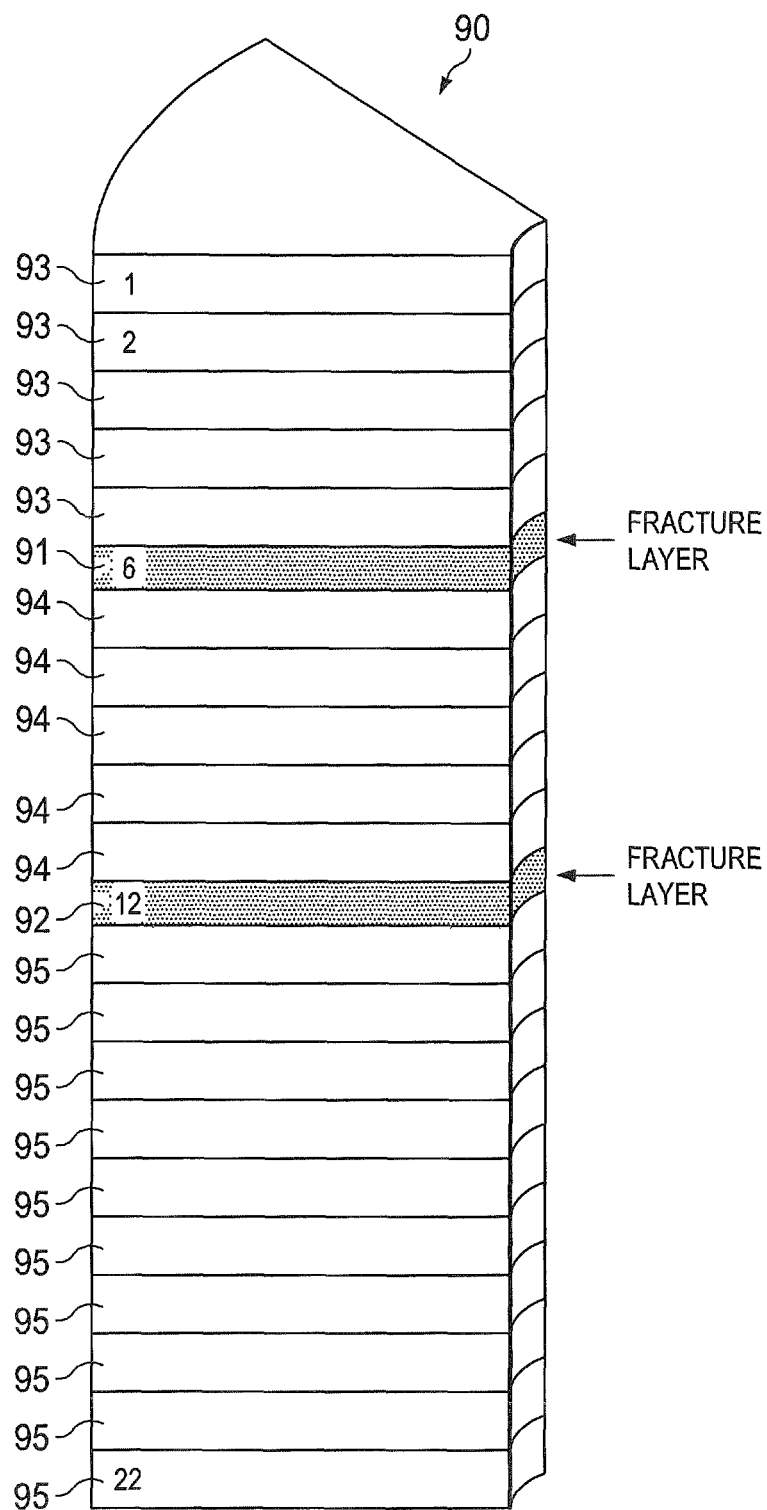
FIG. 9 is a schematic diagram of a well layer model having two fracture layers in radial coordinates.

Two illustrative example model problems are presented below: a seven layer homogeneous reservoir with one fracture flow barrier (FIG. 7); and a twenty-two layer heterogeneous reservoir with two fracture flow barriers (FIG. 9).

Seven Layer Homogeneous Well Model

FIG. 7A illustrates the seven reservoir layers and properties for the original model 70 and reduced model 71. As seen, it was assumed that reservoir has seven layers. Layer thickness of each layer 72 with vertical flow is 10 ft. A layer 73 which represents a fracture with no vertical flow is present which is 1 ft. thick. It was further assumed that the layer 73 does not communicate with the layers 72 above and below. It was assumed that there is a vertical well in the middle, as indicated by an arrow. Initial reservoir potential (datum corrected pressure) is 3,000 psi for the model of FIG. 7A. Each layer 72 was assumed to have 10 md areal permeability $k_x$ and $k_y$ and 1 md vertical permeability $k_z$.

Table 1 summarizes the reservoir and grid properties for the model 70. The grid size in the area direction (square grid) was assumed to be 840 ft. Oil viscosity was set to 1 cp and Oil Formation Volume factor was assumed to be 1. Well Total Oil Production rate was set to 1,000B/D. A Layer Productivity Index PI for each layer completion was calculated by Peaceman's method, as described, and is also shown in Table 1.

TABLE 1

Problem 1—Reservoir Properties

| Layer | Thickness, ft | $K_x = K_y$, md | $K_z$, md | Layer, PI b/d/psi |
|---|---|---|---|---|
| 1 | 10. | 10. | 1 | 0.12 |
| 2 | 10. | 10. | 1 | 0.12 |
| 3 | 1 | 10,000 | 1.e-9 | 12.14 |
| 4 | 10 | 10 | 1 | 0.12 |
| 5 | 10 | 10 | 1 | 0.12 |
| 6 | 10 | 10 | 1 | 0.12 |
| 7 | 10 | 10 | 1 | 0.12 |

Fully Implicit Fully Coupled Simultaneous Solution

The coefficient matrix for the solution of reservoir pressures and the bottom hole pressure is formed in a similar manner explained above with regard to Equations (18-19) and as shown in FIG. 13. It can be seen that there are only 8 unknowns (7 potentials or datum corrected pressures) and the one bottom hole potential), and that the coefficient matrix is non-sparse. The linear system of equations can be solved by a direct method, such as Gaussian Elimination, for the unknown reservoir (layer) potentials $\Phi_i$, i=1,7 and the other unknown $\Phi_W$.

Results

Table 2 summarizes the calculated layer potentials, wellbore potential and layer (completion) flow rates for the model 70 of FIG. 7A.

TABLE 2

Exact Solution of the Original Problem

| Layer | Potential, psi | Bottom hole (Wellbore) Potential, psi | Rate/d |
|---|---|---|---|
| 1 | 2630.61 | 1257.36 | 166.67 |
| 2 | 2630.61 | 1257.36 | 166.67 |
| 3 | 1257.37 | 1257.36 | 0.0 |
| 4 | 2630.61 | 1257.36 | 166.67 |
| 5 | 2630.61 | 1257.36 | 166.67 |
| 6 | 2630.61 | 1257.36 | 166.67 |
| 7 | 2630.61 | 1257.36 | |

From the computed results we see that computed bottom hole potential $\Phi_W$=1257.36 psi.

Formation of the Problem According to the Present Invention

According to the reservoir data in Table 1 and as shown in FIG. 7A, there is only one layer 73 which does not communicate vertically with the other layers. Therefore, as shown in FIG. 7B, the layers 72 above the fracture layer 73 are combined into a single layer according to form the reduced well model in accordance with the present invention. Similarly layers 72 below layer 73 are combined into a single layer. The reduced model now can be seen to have only three layers. The total number of the unknowns is 4 as opposed to 8 as in the full model.

Table 3 summarizes the properties of reduced well model 71 formed according to processing with the present invention.

TABLE 3

Reduced Well Model

| Layer | Thickness, ft | $K_x = K_y$, md | $K_z$, md | PI, b/d/psi |
|---|---|---|---|---|
| 1 | 20 | 10 | 1 | 0.24 |
| 2 | 1 | 10,000 | 0 | 12.14 |
| 3 | 40 | 10 | 1 | 0.40 |

The linear system of equations (Equation 20) for the reduced system still has an unstructured coefficient matrix, but with a 50% less number of unknowns. In actual reservoirs, with hundreds of layers and only a few flow barriers, the well model size reduction according to the present invention would be drastic, for example, a reduced well model system model according to the present invention could be 1 percent of size of the full system. The reduced system is solved by a direct solver for the layer potentials and the bottom hole potential. Table 4 presents the results.

TABLE 4

Results of the Reduced System

| Layer | Potential, psi | Bottom hole (Wellbore) Potential, psi |
|---|---|---|
| 1 | 2630.61 | 1257.36 |
| 2 | 1257.37 | 1257.36 |
| 3 | 2630.61 | 1257.36 |

It can be seen that computed bottom hole potential:

$$\Phi_W = 1257.36 \text{ psi}$$

is exactly the same as the $\Phi_W$ calculated for the full model.

The determined well potential is the only information needed for the next step. The well is next treated as a specified bottom hole pressure (potential) model. Computer processing according to the procedure described with the matrix of FIG. 14 and Equations (16 and 18) are followed to calculate the flow profile (layer rates) and the total well rate. In FIG. 14, upper diagonal solid line of the matrix represents $T_{Up,i}$ as defined by Equation (11), and the lower diagonal solid line of the matrix describes the elements called $T_{Down,i}$ as also defined by Equation (2). The central term $T_{C,i}$ is defined by Equation (17a) and the right hand side bi defined by Equation (17b).

The results are summarized in Table 5. It is to be noted that total calculated well rate is exactly the same as input value of 1,000b/d.

TABLE 5

Results for the Total System with the Present Invention

| Layer | Potential, psi | Rate/d |
|---|---|---|
| 1 | 2630.61 | 166.67 |
| 2 | 2630.61 | 166.67 |
| 3 | 1257.37 | 0.0 |

TABLE 5-continued

Results for the Total System with the Present Invention

| Layer | Potential, psi | Rate/d |
|---|---|---|
| 4 | 2630.61 | 166.67 |
| 5 | 2630.61 | 166.67 |
| 6 | 2630.61 | 166.67 |
| 7 | 2630.61 | 166.67 |
| Total | | 1,000. |

Results presented in Table 5 are the same as in Table 1 for the fully implicit well model. Difference or error between well rates for the calculated and input well is zero for this case and there no need for an extra iteration. This is because of the fact that the reservoir was homogeneous and no upscaling errors were made while forming the reduced system. Matrix diagonal elements and right hand side are the same as in FIG. 14, i.e., lower diagonal solid line represents $T_{up,i}$ defined by Equation (11), upper diagonal solid line describes the elements called $T_{Down,i}$ described above. The central term $T_{C,i}$ defined by Equation (17a) and right hand side $b_i$ defined by Equation (17b).

The terms PI appear on Equation (17) are the perforation productivity indexes for a square grid is defined by:

$$PI_i = 2\pi k_{x,i} \frac{\Delta z_i}{\ln(0.2\Delta x/r_w)}$$

where $r_w$ is the well bore radius.

Comparison with the Explicit Well Model

Figure 8:
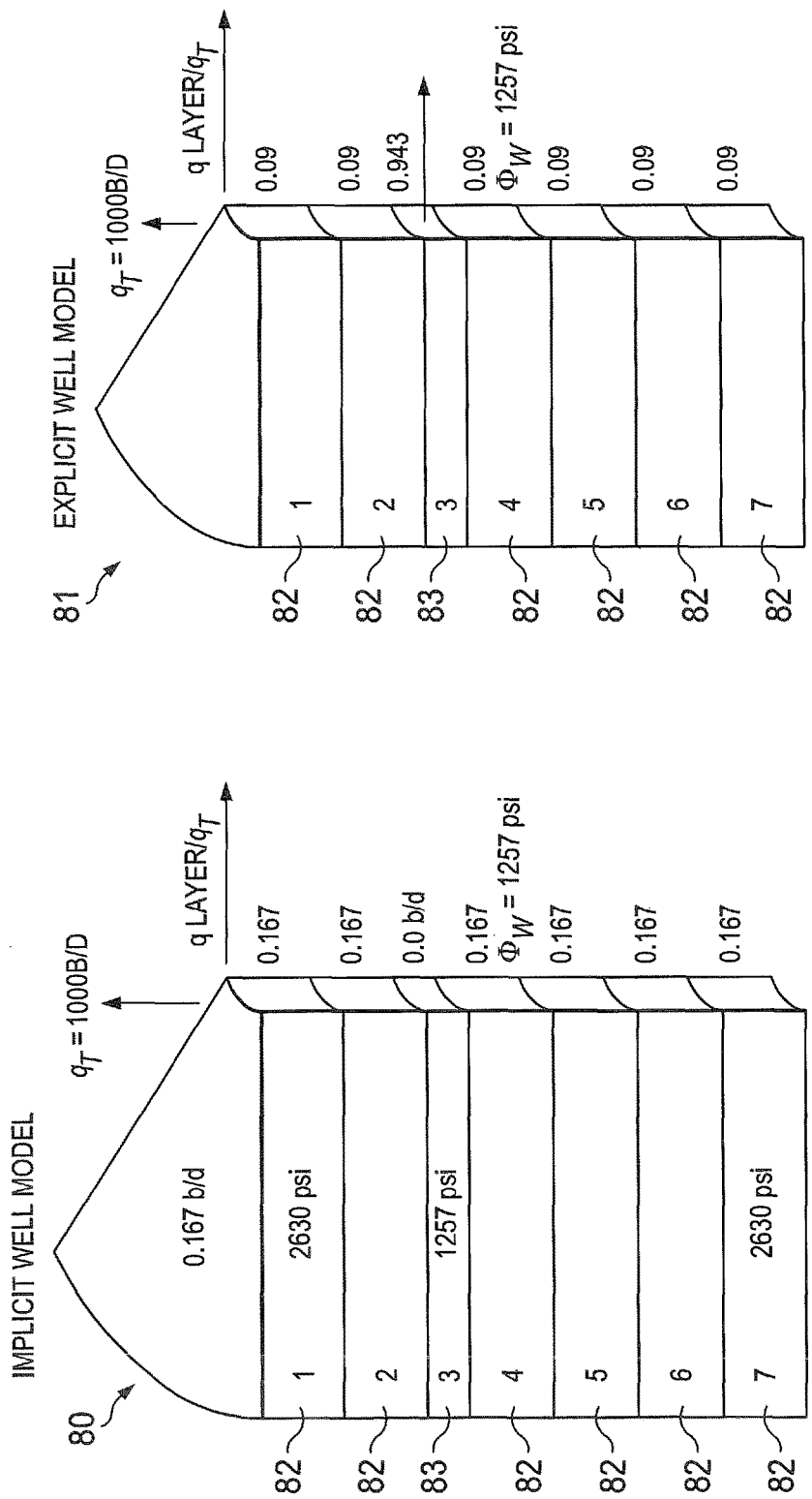
FIGS. 8A and 8B are schematic diagrams of flow profiles illustrating comparisons between the models of FIGS. 7A and 7B, respectively.

In several reservoir simulators, semi implicit well models or explicit well models are used. If the formulation of the well model is semi-implicit but it collapses to explicit in the pressure variable, this formulation collapses to explicit well models. The explicit well model is for this problem obtained by following the computer processing procedures for the matrix of FIG. 12 and Equations (12-14). In FIG. 12, the terms $T_{Down,i}$, $T_{Up,i}$ which appear on the diagonal elements are defined by Equation (11), and $T_{c,i}$, $b_i$ are defined by Equation (14a) and Equation (14b). FIG. 8A illustrates the seven reservoir layers and properties for an implicit well model 80 and FIG. 8B an explicit well model 81, of like structure to the model of FIGS. 7A and 7B. As seen it was assumed that reservoir has seven layers. Layers 82 each have a potential Φ of 2630 psi. A layer 83 which represents a fracture and was further assumed that does not communicate with the layers 72 above and below has a potential D of 1257 psi. It was assumed that there is a vertical well in the middle, as indicated by an arrow. FIGS. 8A and 8B compare the results of Implicit and Explicit Models. Computed perforation (layer) rates are summarized in Table 6.

TABLE 6

Comparison of Perforation (Layer) Rates for Different Well Models

| Layer/ Perforation | Exact Solution (Fully Implicit Fully Coupled Simultaneous Solution ), Rate b/d | New Method Rate, b/d | Explicit Method Rate, b/d |
|---|---|---|---|
| 1 | 166.67 | 166.67 | 9.43 |
| 2 | 166.67 | 166.67 | 9.73 |
| 3 | 0.0 | 0.0 | 943.40 |
| 4 | 166.67 | 166.67 | 9.43 |
| 5 | 166.67 | 166.67 | 9.43 |
| 6 | 166.67 | 166.67 | 9.43 |
| 7 | 166.67 | 166.67 | 9.43 |

As can be seen, the model 81 according to the explicit method is inaccurate; it totally miscalculates the perforation rate. The explicit model method assigns practically all the well production from the thin fracture layer 83 as indicated in FIG. 8B since this layer has the highest productivity index.

The implicit methods (whether the computationally intensive fully implicit model or the reduced model according to the present invention) do not make such an assignment and instead determine that the layer 83 is not getting fluid support from the layers 82 above and below. The only fluid support a fracture layer of this type shown at 83 when present in an actual reservoir can get is from its planar neighboring cells. However, since the fracture layer is a very thin layer, transmissibility in these directions is by nature small. Therefore, the fracture layer cannot supply fluid at the rates simulated by the explicit model.

In fact, conventional implicit well models show that during the transient time the fracture layers support most of the well production as do the explicit methods. However, the layer pressure in layer 83 quickly declines and assumes the value of the uniform wellbore potential (constant bottom hole pressure). After the pressure declines, it reaches steady state, and the well production rate is in fact made by the contribution from the layers 82 above and below the vertical flow barrier 83.

Twenty-Two Layer Heterogeneous Reservoir Model

A model grid system 90 includes twenty two layers as shown in FIG. 9. The location of high permeability fracture layers 6 and 12 as counted moving downward through the layer and indicated schematically at 91 and 92. There are five layers 93, numbered 1 through 5 above layer 91, each with vertical flow. There are also five layers 94 in the model 90 with vertical flow between the flow barrier layers 91 and 92, and ten layers 95 with vertical flow located below the flow barrier layer 92. Reservoir data for the model 90 is shown in Table 7.

TABLE 7

Reservoir Data for 22 Layer Problem

| Layer | Thickness, ft | Permeability, mD ($K_x = K_y$) | Vertical Permeability, $K_z$, mD |
|---|---|---|---|
| 1 | 10 | 2 | 2 |
| 2 | 10 | 5 | 1 |
| 3 | 10 | 3 | 3 |
| 4 | 10 | 10 | 5 |
| 5 | 10 | 5 | 4 |
| 6 | 1 | 1,000. | 1.e-9 |
| 7 | 10 | 6 | 6 |

TABLE 7-continued

Reservoir Data for 22 Layer Problem

| Layer | Thickness, ft | Permeability, mD ($K_x = K_y$) | Vertical Permeability, $K_z$, mD |
|---|---|---|---|
| 8 | 10 | 3 | 3 |
| 9 | 10 | 9 | 6 |
| 10 | 10 | 12 | 2 |
| 11 | 10 | 5 | 5 |
| 12 | 1 | 1,000. | 1.e-9 |
| 13 | 10 | 7.5 | 3.5 |
| 14 | 10 | 7.5 | 3.5 |
| 15 | 10 | 7.5 | 3.5 |
| 16 | 10 | 7.5 | 3.5 |
| 17 | 10 | 7.5 | 3.5 |
| 18 | 10 | 9.2 | 1.2 |
| 19 | 10 | 9.2 | 1.2 |
| 20 | 10 | 9.2 | 1.2 |
| 21 | 10 | 9.2 | 1.2 |
| 22 | 10 | 9.2 | 1.2 |

Areal neighboring cell permeabilities=20 mD
Total Well Production Rate=2,500 B/D
Well Completed in all layers.

Results

Fully Implicit Fully Coupled Simultaneous Solution Calculated bottom hole potential $\Phi_W$=1421.247 psi

TABLE 8

Potential Distribution, psi

| Layer | $\Phi_W$ | $\Phi_i$ |
|---|---|---|
| 1 | 1421.25 | 2901.32 |
| 2 | 1421.25 | 2900.82 |
| 3 | 1421.25 | 2900.38 |
| 4 | 1421.25 | 2900.38 |
| 5 | 1421.25 | 2900.38 |
| 6 | 1421.25 | 1421.25 |
| 7 | 1421.25 | 2864.43 |
| 8 | 1421.25 | 2864.37 |
| 9 | 1421.25 | 2864.10 |
| 10 | 1421.25 | 2863.88 |
| 11 | 1421.25 | 2864.03 |
| 12 | 1421.25 | 1421.25 |
| 13 | 1421.25 | 2841.62 |
| 14 | 1421.25 | 2841.58 |
| 15 | 1421.25 | 2841.48 |
| 16 | 1421.25 | 2841.33 |
| 17 | 1421.25 | 2841.13 |
| 18 | 1421.25 | 2840.65 |
| 19 | 1421.25 | 2840.08 |
| 20 | 1421.25 | 2839.65 |
| 21 | 1421.25 | 2839.37 |
| 22 | 1421.25 | 2839.24 |

The model 90 was then subjected to the explicit model techniques of the type described above and flow data determined. A comparison of flow rate distribution for fully implicit and explicit processing of the reservoir model 90 using techniques previously described is set forth in Table 9.

TABLE 9

Comparison of Flow Rates for Fully Implicit Fully Coupled and Explicit Well Methods

| Layer | Implicit | Explicit |
|---|---|---|
| 1 | 35.93 | 14.56 |
| 2 | 89.78 | 36.39 |
| 3 | 53.85 | 21.83 |
| 4 | 179.48 | 72.78 |
| 5 | 89.74 | 36.39 |
| 6 | 0.00 | 727.80 |
| 7 | 105.09 | 43.67 |
| 8 | 52.54 | 21.83 |
| 9 | 157.60 | 65.50 |
| 10 | 210.10 | 87.34 |
| 11 | 87.55 | 36.39 |
| 12 | 0.00 | 727.80 |
| 13 | 129.29 | 54.59 |
| 14 | 129.28 | 54.59 |
| 15 | 129.28 | 54.59 |
| 16 | 129.26 | 54.59 |
| 17 | 129.24 | 54.59 |
| 18 | 158.49 | 66.96 |
| 19 | 158.42 | 66.96 |
| 20 | 158.37 | 66.96 |
| 21 | 158.34 | 66.96 |
| 22 | 158.33 | 66.96 |

Reduced Model Construction

Since there are only two vertical flow barriers layers 91 and 92, layers 93 above layer 91 in FIG. 9 can be combined into one layer; layers 94 below layer 91 into one layer, and layers 95 below layer 92 into another single layer: Therefore the total number of layers according to the present invention is 5. The properties of the reduced model are as follows:

TABLE 10

Reduced Well Model Properties

| Layer | Thickness, ft | $K_x$, mD | $K_z$, mD | PI, b/d/psi | PI Fraction |
|---|---|---|---|---|---|
| 1 | 50 | 5 | 2.19 | 0.3 | 0.07 |
| 2 | 1 | 1000 | 0 | 1.21 | 0.29 |
| 3 | 50 | 7 | 3.66 | 0.42 | 0.10 |
| 4 | 1 | 1000 | 0 | 1.21 | 0.29 |
| 5 | 100 | 8.35 | 1.79 | 1.01 | 0.24 |

Calculated Bottom Hole Potential $\Phi_w$=1421.34 psi

The reduced model in accordance with the present invention the proceeds to determine bottom hole potential $\Phi_w$. The results of the reduced model with five layers are set forth below in Table 11.

TABLE 11

Potential Distribution

| Layer | Pot wf | Pot |
|---|---|---|
| 1 | 1421.34 | 2900.53 |
| 2 | 1421.34 | 1421.35 |
| 3 | 1421.34 | 2864.16 |
| 4 | 1421.34 | 1421.35 |
| 5 | 1421.34 | 2740.61 |

Using the bottom hole Potential $\Phi_w$ calculated from the reduced model and computing potentials using specified bottom hole pressure $\Phi_w$ for the full model, completion layer rates are calculated according to Equation (17). The results are indicated below in Table 12.

TABLE 12

Calculated Well Layer Rates

| Layer | New Method | Fully Coupled Method |
|---|---|---|
| 1 | 35.92 | 35.93 |
| 2 | 89.78 | 89.78 |
| 3 | 53.85 | 53.48 |
| 4 | 179.47 | 179.47 |
| 5 | 89.73 | 89.73 |
| 6 | 0.00 | 0.00 |
| 7 | 105.09 | 105.09 |
| 8 | 52.54 | 52.54 |
| 9 | 157.59 | 157.60 |
| 10 | 210.09 | 210.10 |
| 11 | 87.55 | 87.55 |
| 12 | 0.00 | 0.00 |
| 13 | 129.28 | 129.29 |
| 14 | 129.28 | 129.28 |
| 15 | 129.27 | 129.28 |
| 16 | 129.25 | 129.26 |
| 17 | 129.24 | 129.24 |
| 18 | 158.48 | 158.49 |
| 19 | 158.41 | 158.42 |
| 20 | 158.37 | 158.37 |
| 21 | 158.33 | 158.34 |
| 22 | 158.32 | 158.33 |

Newly calculated $q_t$ = 2499.84 b/d

Error = 2,500.-2499.8488 = 0.15 b/d

Error in the total rate and computed bottom hole pressure vanishes with the simulator's non-linear Newton iterations. The present invention obtains a reduced model with a production rate acceptably accurate in comparison to the results obtained by the fully implicit, fully coupled processing techniques of the prior art, but with a substantial reduction in model complexity and computer processing time.

The present invention, as has been described above, does not require a special linear solver for the solution of the coupled reservoir and well equations. In contrast, the coefficient matrix for the previously used coupled reservoir and well equations does not have regular sparse structure. Therefore, the conventional types of coupled reservoir and well equations require special solvers which can be expensive and can also face convergence problems.

It can be seen that, as described above, the present invention does not require any special solver for the solution of coupled reservoir and well equations. The same solver used for reservoir equations is utilized. The only modification made to the coefficient matrix is in the diagonal terms.

The present invention solves reservoir simulation problems where the vertical wells have many completions, which is a common occurrence in reservoirs. In recent simulation studies wells with more than 100 vertical layers (completions) are very common. The fully coupled fully implicit well model with simultaneous solution is very expensive for these cases. The present invention can save significant amounts of computer time.

The present invention is very useful for wells having hundreds of perforations completed in highly heterogeneous reservoirs. The present invention reduces the large, time consuming problem of well modeling simulation in reservoirs with large numbers of layers (completions) problem to a small problem by recognizing and advantageously using the physical principles involved. With the present invention, it has been found that vertically communicating layers can be lumped into a single layer. The reduced model so formed preserves the same bottom hole pressure as the original full model. Once the reduced model is solved for the bottom hole pressure, the wells in the large system are then treated as specified bottom hole pressure and solved easily by a conventional linear solver. Thus, the present invention eliminates the need for writing or acquiring unstructured linear solvers for many wells with hundreds of completions, which would be expensive.

The invention has been sufficiently described so that a person with average knowledge in the matter may reproduce and obtain the results mentioned in the invention herein Nonetheless, any skilled person in the field of technique, subject of the invention herein, may carry out modifications not described in the request herein, to apply these modifications to a determined structure, or in the manufacturing process of the same, requires the claimed matter in the following claims; such structures shall be covered within the scope of the invention.

It should be noted and understood that there can be improvements and modifications made of the present invention described in detail above without departing from the spirit or scope of the invention as set forth in the accompanying claims.

The invention claimed is:

1. A computer implemented method of forming a model of determined well completion rates of component fluids of a subsurface reservoir from measured total well production by reservoir simulation of well production, at a time step during life of the subsurface reservoir, from a plurality of vertical wells in the subsurface reservoir with a coupled well reservoir simulator model, the reservoir simulator model having formation layers having unknown formation pressures and completion rates at the time step, the formation layers comprising vertical fluid flow layers having vertical fluid flow therefrom and flow barrier layers with no vertical fluid flow therefrom, the coupled well reservoir simulator model being organized into a plurality of cells including a plurality of well cells at locations of the vertical wells in formation layers of the reservoir, and a plurality of reservoir cells adjacent the well cells and the reservoir cells of the formation layers having unknown formation pressures, transmissibilities and completion rates at the time step, the method comprising the computer implemented steps of:

forming a reduced system model of the plurality of vertical wells consisting of:
interval well cells between flow barrier layers of the reservoir assembled by combining vertically disposed well cells of the vertical flow formation layers having vertical fluid communication therebetween and being located between flow barrier layers in the coupled reservoir model; and
reservoir cells adjacent the interval well cells;
solving the reduced system model for bottom hole pressures of the plurality of wells;
solving by reservoir simulation the coupled well reservoir model of well cells and reservoir cells for layer completion rates of component fluids of the well cells of each of the formation layers of the coupled well reservoir model at the time step, based on a steady state volume balance relationship of the layer completion rates, formation pressures and transmissibilities, and treating the plurality of wells as having the determined bottom hole pressure;
determining a simulator total well production rate for the plurality of wells from the layer completion rates of the component fluids of the formation layers of the coupled reservoir model of the well at the time step;
comparing the simulator total well production rate for the plurality of wells with the measured total well production at the time step to determine if simulator convergence is achieved; and, if so,
forming a record of the layer completion rates of the component fluids for the layers at the well cells and of the determined total well production rate for the plurality of wells at the time step; and
if the results of the step of comparing indicate convergence is not achieved, iterating to the step of solving by reservoir simulation the coupled well reservoir model, determining a simulator total well production rate for the plurality of wells from the well completion rates of the component fluids, and comparing.

2. The computer implemented method of claim 1, wherein the coupled well reservoir model has a plurality of flow barrier layers vertically spaced from each other by vertically disposed well cells and wherein the step of assembling comprises assembling as separate interval well cells the interval well cells between vertically adjacent pairs of the vertically spaced flow barrier layers.

3. The computer implemented method of claim 1, wherein the step of forming a record comprises the step of storing in computer memory the determined layer completion rates for the component fluids of the plurality of wells and the determined total well production rate for the plurality of wells at the time step.

4. The computer implemented method of claim 1, wherein the step of forming a record comprises the step of forming an output display of the determined layer completion rates for the component fluids of the plurality of wells and the determined total well production rate for the plurality of wells at the time step.

5. The computer implemented method of claim 1, further including the step of identifying the flow barrier layers in the reservoir.

6. The computer implemented method of claim 1, wherein the coupled well reservoir model is formed as a structured matrix and the step of solving by reservoir simulation comprises the step of:
solving the coupled well reservoir model structured matrix.

7. The computer implemented method of claim 1, wherein the step of comparing the simulator total well production rate for the plurality of wells with the measured total well production rate for the plurality of wells indicates convergence is achieved, and further including the steps of:

incrementing the simulator time step: and repeating for the incremented time step the steps of forming a reduced system model, solving the reduced system model for a bottom hole pressure of the plurality of wells, solving by reservoir simulation the coupled well reservoir model, determining a simulator total well production rate for the plurality of wells from the well completion rates of the component fluids, and comparing.

8. A data processing system for forming a model of determined well completion rates of component fluids of a subsurface reservoir from measured total well production by reservoir simulation of well production, at a time step during life of the reservoir, from a plurality of vertical wells in the subsurface reservoir with a coupled well reservoir simulator model, the reservoir simulator model having formation layers having unknown formation pressures and completion rates at the time step, the formation layers comprising vertical fluid flow layers having vertical fluid flow therefrom and flow barrier layers with no vertical fluid flow therefrom, the coupled well reservoir simulator model being organized into a plurality of cells including a plurality of well cells at locations of the vertical wells in formation layers of the reservoir, and a plurality of reservoir cells adjacent the well cells and the reservoir cells of the formation layers having unknown formation pressures, transmissibilities and completion rates at the time step, the data processing system comprising:

a processor performing the steps of:

forming a reduced system model of the plurality of vertical wells consisting of:

interval well cells between flow barrier layers of the reservoir assembled by combining vertically disposed well cells of the vertical flow formation layers having vertical fluid communication therebetween and being located between flow barrier layers in the coupled reservoir model; and reservoir cells adjacent the interval well cells;

solving the reduced system model for a bottom hole pressure of the plurality of wells;

solving by reservoir simulation the coupled well reservoir model of well cells and reservoir cells for layer completion rates of component fluids of the well cells of each of the formation layers of the coupled well reservoir model at the time step, based on a steady state volume balance relationship of the layer completion rates, formation pressures and transmissibilities, and treating the plurality of wells as having the determined bottom hole pressure;

determining a simulator total well production rate for the plurality of wells from the layer completion rates of the component fluids of the formation layers of the coupled reservoir model of the well at the time steps;

comparing the simulator total well production rate for the plurality of wells with the measure total well production at the time step to determine if simulator convergence is achieved; and, if so, writing to memory a record of the layer completion rates of the component fluids for the layers at the well cells and of the determined total well production rate for the plurality of wells at the time step; and if the results of the step of comparing indicate convergence is not achieved, iterating to the step of solving by reservoir simulation the coupled well reservoir model, determining a simulator total well production rate for the plurality of wells from the well completion rates of the component fluids, and comparing; and the data processing system further including:

a memory forming a record of the layer completion rates for the component fluids for the layers at the well cells and of the determined total well production rate for the plurality of wells at the time step.

9. The data processing system of claim 8, further including:

a display forming an output image of the layer completion rates for the component fluids for the layers at the well cells and of the determined total well production rate for the plurality of wells at the time step.

10. The data processing system of claim 8, wherein the coupled well reservoir model has a plurality of flow barrier layers vertically spaced from each other by vertically disposed well cells and wherein the processor in performing the step of assembling assembles as separate interval well cells the interval well cells between vertically adjacent pairs of the vertically spaced flow barrier layers.

11. The data processing system of claim 8, further including the processor performing step of identifying the flow barrier layers in the reservoir.

12. The data processing system of claim 8, wherein the coupled well reservoir model is formed as a structured matrix and the processor in performing the step of solving by reservoir simulation performs the step of:

solving the coupled well reservoir model structured matrix.

13. The data processing system of claim 8, wherein the processor during the step of comparing the simulator total well production rate for the well with the measured total well production rate for the plurality of wells indicates convergence is achieved, and the processor further performs the steps of:

incrementing the simulator time step: and repeating for the incremented time step the steps of forming a reduced system model, solving the reduced system model for a bottom hole pressure of the plurality of wells, solving by reservoir simulation the coupled well reservoir model, determining a simulator total well production rate for the plurality of wells from the well completion rates of the component fluids, and comparing.

14. A data storage device having stored in a non-transitory computer readable medium computer operable instructions for causing a data processor, in forming a model of determined well completion rates of component fluids of a subsurface reservoir from measured total well production by reservoir simulation of well production, at a time step during life of the subsurface reservoir, from a plurality of vertical wells in the subsurface reservoir with a coupled well reservoir simulator model, the reservoir simulator model having formation layers having unknown formation pressures and completion rates at the time step, the formation layers comprising vertical fluid flow layers having vertical fluid flow therefrom and flow barrier layers with no vertical fluid flow therefrom, the coupled well reservoir simulator model being organized into a plurality of cells including a plurality of well cells at locations of the vertical well in formation layers of the reservoir, and a plurality of reservoir cells adjacent the well cells, the well cells and the reservoir cells of the formation layers having unknown formation pressures, transmissibilities and completion rates at the time step, to perform a sequence of steps comprising:

forming a reduced system model of the plurality of vertical wells consisting of:

interval well cells between flow barrier layers of the reservoir assembled by combining vertically disposed well cells of the vertical flow formation layers having vertical fluid communication therebetween and being located between flow barrier layers in the coupled reservoir model; and reservoir cells adjacent the interval well cells;

solving the reduced system model for a bottom hole pressure of the plurality of wells;

solving by reservoir simulation the coupled well reservoir model of well cells and reservoir cells for layer completion rates of component fluids of the well cells of each of the formation layers of the coupled well reservoir model at the time step, based on a steady state volume balance relationship of the layer completion rates, formation pressures and transmissibilities, and treating the plurality of wells as having the determined bottom hole pressure;

determining a simulator total well production rate for the plurality of wells from the layer completion rates of the component fluids of the formation layers of the coupled reservoir model of the wells at the time step;

comparing the simulator total well production rate for the plurality of wells with the measured total well production at the time step to determine if simulator convergence is achieved; and, if so, forming a record the layer completion rates of the component fluids for the layers at the well cells and of the determined total well production rate for the plurality of wells at the time step; and if the results of the step of comparing indicate convergence is not achieved, iterating to the step of solving by reservoir simulation the coupled well reservoir model, determining a simulator total well production rate for the plurality of wells from the well completion rates of the component fluids, and comparing.

15. The data storage device of claim 14, wherein the coupled well reservoir model has a plurality of flow barrier layers vertically spaced from each other by vertically disposed well cells and wherein the stored instructions for the step of assembling comprise instructions for assembling as separate interval well cells the interval well cells between vertically adjacent pairs of the vertically spaced flow barrier layers.

16. The data storage device of claim 14, further including the stored instructions comprising instructions causing the processor to perform the step of identifying the flow barrier layers in the reservoir.

17. The data storage device of claim 14, wherein the coupled well reservoir model is formed as a structured matrix and the instructions for the step of solving by reservoir simulation further include instructions causing the data processor to perform the step of:

solving the coupled well reservoir model structured matrix.

18. The data storage device of claim 14, wherein comparing the simulator total well production rate for the well with the measured total well production rate for the well indicates convergence is achieved, and wherein the stored instructions further include instructions causing the processor to perform the steps of:

incrementing the simulator time step: and repeating for the incremented time step the steps of forming a reduced system model, solving the reduced system model for a bottom hole pressure of the plurality of wells, solving by reservoir simulation the coupled well reservoir model, determining a simulator total well production rate for the plurality of wells from the well completion rates of the component fluids, and comparing.

* * * * *